United States Patent
Lee et al.

(10) Patent No.: US 11,076,419 B2
(45) Date of Patent: Jul. 27, 2021

(54) METHOD FOR TRANSMITTING UPLINK DATA IN WIRELESS COMMUNICATION SYSTEM AND APPARATUS THEREFOR

(71) Applicant: LG ELECTRONICS INC., Seoul (KR)

(72) Inventors: Eunjong Lee, Seoul (KR); Heejeong Cho, Seoul (KR); Genebeck Hahn, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 42 days.

(21) Appl. No.: 16/085,545

(22) PCT Filed: Mar. 14, 2016

(86) PCT No.: PCT/KR2016/002522
§ 371 (c)(1),
(2) Date: Sep. 14, 2018

(87) PCT Pub. No.: WO2017/159886
PCT Pub. Date: Sep. 21, 2017

(65) Prior Publication Data
US 2019/0104541 A1    Apr. 4, 2019

(51) Int. Cl.
*H04W 4/90* (2018.01)
*H04W 72/14* (2009.01)
(Continued)

(52) U.S. Cl.
CPC .......... *H04W 72/14* (2013.01); *H04L 1/1819* (2013.01); *H04L 5/00* (2013.01); *H04W 4/90* (2018.02);
(Continued)

(58) Field of Classification Search
CPC . H04W 72/04; H04W 88/08; H04W 72/0453; H04W 72/14; H04W 28/0278;
(Continued)

(56) References Cited

U.S. PATENT DOCUMENTS

| 2008/0002793 A1* | 1/2008 | Giorgetta | H04B 17/24 375/346 |
| 2010/0202420 A1* | 8/2010 | Jersenius | H04J 11/00 370/337 |

(Continued)

FOREIGN PATENT DOCUMENTS

| EP | 2704463 | 3/2014 |
| EP | 2763449 | 8/2014 |
| WO | 2013137582 | 9/2013 |

OTHER PUBLICATIONS

PCT International Application No. PCT/KR2016/002522, International Search Report dated Dec. 3, 2016, 3 pages.

*Primary Examiner* — Hassan A Phillips
*Assistant Examiner* — Prenell P Jones
(74) *Attorney, Agent, or Firm* — Lee Hong Degerman Kang Waimey

(57) ABSTRACT

The present invention relates to a method and an apparatus for transmitting and receiving data in a wireless communication system. The present invention may provide a method comprising the steps of: receiving, from a terminal, an urgent signal indicating the occurrence of an event related to an urgent situation; and transmitting, to at least one terminal included in a cell, a response signal for notifying the at least one terminal of the occurrence of the event.

17 Claims, 23 Drawing Sheets

(51) Int. Cl.
| | |
|---|---|
| *H04W 72/12* | (2009.01) |
| *H04L 5/00* | (2006.01) |
| *H04W 76/28* | (2018.01) |
| *H04W 76/11* | (2018.01) |
| *H04W 76/27* | (2018.01) |
| *H04L 1/18* | (2006.01) |
| *H04W 28/02* | (2009.01) |
| *H04W 68/02* | (2009.01) |
| *H04W 72/04* | (2009.01) |
| *H04W 74/08* | (2009.01) |
| *H04W 80/02* | (2009.01) |

(52) U.S. Cl.
CPC ....... *H04W 28/0278* (2013.01); *H04W 68/02* (2013.01); *H04W 72/0446* (2013.01); *H04W 72/1242* (2013.01); *H04W 72/1278* (2013.01); *H04W 74/0833* (2013.01); *H04W 76/11* (2018.02); *H04W 76/27* (2018.02); *H04W 76/28* (2018.02); *H04L 5/0007* (2013.01); *H04W 80/02* (2013.01)

(58) Field of Classification Search
CPC ............. H04W 68/02; H04W 72/0446; H04W 72/1278; H04W 74/0833; H04W 72/1242; H04W 4/90; H04W 76/11; H04W 76/27; H04L 5/00; H04L 1/1819; H04L 5/0007
See application file for complete search history.

(56) References Cited

U.S. PATENT DOCUMENTS

| | | | | |
|---|---|---|---|---|
| 2010/0254329 A1* | 10/2010 | Pan | ........................ | H04L 5/0078 370/329 |
| 2010/0322172 A1* | 12/2010 | Hsu | ........................ | H04L 1/1867 370/329 |
| 2010/0323719 A1* | 12/2010 | Jen | ........................ | H04W 64/00 455/456.1 |
| 2011/0014922 A1* | 1/2011 | Jen | ........................ | H04W 74/002 455/450 |
| 2011/0059718 A1 | 3/2011 | Wang et al. | | |
| 2013/0114461 A1* | 5/2013 | Seo | ........................ | H04L 1/0026 370/252 |
| 2014/0134970 A1 | 5/2014 | Pazos et al. | | |
| 2014/0177573 A1* | 6/2014 | Han | ................... | H04W 72/1242 370/329 |
| 2014/0233507 A1* | 8/2014 | Bertrand | ........... | H04W 56/0005 370/329 |
| 2015/0009881 A1* | 1/2015 | Yeh, II | ................. | H04W 72/005 370/312 |
| 2015/0147995 A1* | 5/2015 | Bontu | .................. | G08B 27/001 455/404.1 |
| 2016/0050664 A1* | 2/2016 | Krishnamoorthi | ........................... | H04W 72/1215 370/329 |
| 2016/0050685 A1* | 2/2016 | Krishnamoorthi | .... | H04W 8/183 370/329 |
| 2016/0050686 A1* | 2/2016 | Krishnamoorthi | .... | H04W 28/04 455/418 |
| 2016/0062465 A1* | 3/2016 | Moussette | ............... | G06F 3/016 345/156 |
| 2016/0105882 A1* | 4/2016 | Park | ....................... | H04L 5/0053 370/329 |
| 2016/0173239 A1* | 6/2016 | Kim | ...................... | H04L 1/1812 370/329 |
| 2016/0192420 A1* | 6/2016 | Kim | ...................... | H04W 74/00 370/329 |
| 2016/0205717 A1* | 7/2016 | Kazmi | .................. | H04W 8/005 455/435.2 |
| 2016/0219583 A1* | 7/2016 | Blankenship | ..... | H04W 72/1289 |
| 2016/0381539 A1* | 12/2016 | Park | ....................... | H04W 4/029 455/404.2 |
| 2017/0150330 A1* | 5/2017 | Kim | ...................... | H04W 72/042 |
| 2017/0181159 A1* | 6/2017 | Zacharias | ......... | H04W 72/0446 |
| 2017/0367087 A1* | 12/2017 | Seo | ........................ | H04W 72/10 |
| 2018/0020449 A1* | 1/2018 | Lee | ........................ | H04W 4/90 |
| 2018/0061243 A1* | 3/2018 | Shloosh | ............. | G08G 5/0091 |
| 2018/0139586 A1* | 5/2018 | Park | ....................... | H04L 5/0048 |
| 2018/0192434 A1* | 7/2018 | Lee | ........................ | H04W 28/26 |
| 2019/0027448 A1* | 1/2019 | Marzaki | ............. | H01L 29/0649 |
| 2019/0045456 A1* | 2/2019 | Seo | ........................ | H04W 52/243 |
| 2019/0103951 A1* | 4/2019 | Park | ....................... | H04L 1/1861 |
| 2020/0111334 A1* | 4/2020 | Moussette | ......... | H04M 1/72454 |

\* cited by examiner (a) Control plane protocol stack (b) User plane protocol stack (a) 1 TX or 2 TX (b) 4TX (a) R/R/E/LCID/F/L sub-header with 7-bit L field (b) R/R/E/LCID/F/L sub-header with 15-bit L field R/R/E/LCID sub-header (a)

(b)

METHOD FOR TRANSMITTING UPLINK DATA IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/002522, filed on Mar. 14, 2016, the contents of which are hereby incorporated by reference herein in its entirety.

TECHNICAL FIELD

The present invention relates to a wireless communication system, and more particularly, to a method for transmitting, by a user equipment, uplink data to a base station and an apparatus therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An embodiment of the present invention is to provide a method for more rapidly transmitting, when an event related with an urgent situation occurs, information or a message on an urgent situation by canceling or delaying transmission of data having a lower priority than the event.

Further, an embodiment of the present invention is to provide a method for defining an urgent signal in advance for each event or user equipment so that a base station may rapidly know which event occurs only by detecting the urgent signal.

In addition, an embodiment of the present invention is to provide a method for defining a transmission time of an urgent message including detailed information for the urgent situation in order to increase efficiency of a limited uplink resource.

The technical objects of the present invention are not limited to the aforementioned technical objects, and other technical objects, which are not mentioned above, will be apparently appreciated by a person having ordinary skill in the art from the following description.

Technical Solution

In this specification, provided is a method for transmitting and receiving data in a wireless communication system, which includes: receiving an urgent signal notifying occurrence of an event related to an urgent situation from a user equipment; transmitting an indicator indicating a channel in which a response signal for notifying occurrence of the event is transmitted to at least one user equipment included in a cell; and transmitting the response signal to the at least one user equipment, in which the response signal is transmitted through a downlink control channel or a downlink data channel.

Further, in the present invention, when the response signal is transmitted through the downlink control channel, system information is transmitted to the at least one user equipment and the system information includes information on a resource region in which the response signal is transmitted in the downlink control channel and the indicator.

In addition, in the present invention, the resource region is positioned in one symbol of first to third orthogonal frequency division multiplexing (OFDM) symbols of a subframe.

Further, in the present invention, the resource region is positioned next a physical control format indication channel (PCFICH) or a physical hybrid-ARQ indicator channel (PHICH) of the downlink control channel.

In addition, in the present invention, the response signal is transmitted through an on/off keying scheme or a common search space.

Further, in the present invention, when the response signal is transmitted by the on/off keying scheme, 1-bit information is spread to four consecutive resource elements.

In addition, in the present invention, the spreading is repeated three times.

In addition, in the present invention, information related to the event is transmitted through a physical broadcast channel (PBCH) to the at least one user equipment.

Further, in the present invention, when the response signal is transmitted through the downlink data channel, the response signal is included in an RRC message and transmitted.

In addition, in the present invention, the RRC message is transmitted by any one scheme of broadcast, unicast, and multi-cast transmission schemes.

Further, in the present invention, when the RRC message is transmitted by any one scheme of the unicast and multi-cast transmission schemes, the RRC message is transmitted through a specific radio network temporary identifier (RNTI) for transmitting the response signal.

Further, in the present invention, provided is a base station which includes: a communication unit transmitting and receiving a radio signal to and from the outside; and a processor functionally coupled with the communication unit, in which the processor receives an urgent signal notifying occurrence of an event related to an urgent situation from a user equipment, transmits an indicator indicating a channel in which a response signal for notifying occurrence of the event is transmitted to at least one user equipment included in a cell, and transmits the response signal to the at least one user equipment, and the response signal is transmitted through a downlink control channel or a downlink data channel.

Advantageous Effects

The present invention has an advantage in that an urgent signal is defined in advance for each event or for each user equipment, and as a result, a user equipment sensing an emergent situation can rapidly notify a corresponding situation to a base station and monopolize uplink resources more rapidly than the related art.

The fast uplink resource monopolization by an urgent user equipment enables an urgent message to be transmitted to the base station more safely and without an error (allows the entirety of one SF resource to be secured so as to generate and transmit a message resistant to the error), thereby guaranteeing not only a transmission latency but also transmission reliability.

Therefore, through a method proposed by this specification, there is an effect that uplink data transmission of the user equipment having a delay of 9 ms to 17.5 ms is reduced from a maximum of 7 ms to 5 ms.

Further, in this specification, since not a contention-based resource but a resource occupation scheme by base station control is used, a resource conflict problem which may occur in a contention-based resource occupation scheme is resolved, thereby transmitting a message which is more safe and is resistant to the error.

Effects which can be obtained in the present invention are not limited to the aforementioned effects and other unmentioned effects will be clearly understood by those skilled in the art from the following description.

MODE FOR INVENTION

Figure 1:
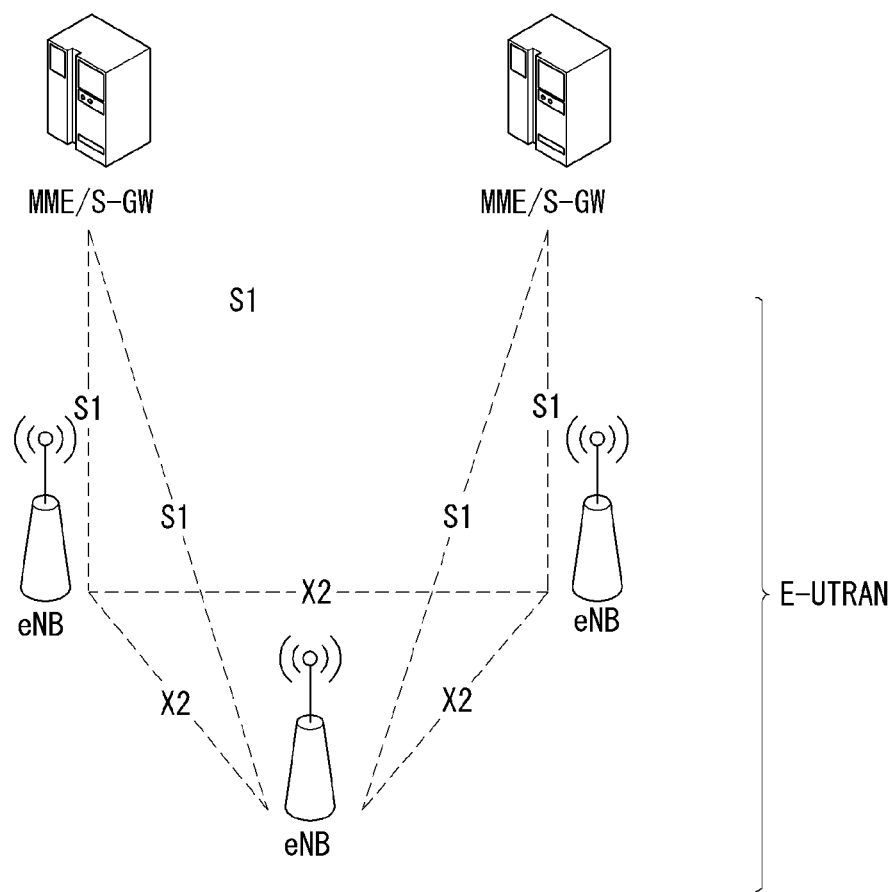
FIG. 1 illustrates an example of a network structure of an evolved universal terrestrial radio access network (E-UTRAN) to which the present invention can be applied.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE/LTE-A system. However, the technical features of the present invention are not limited thereto.

General System

FIG. 1 illustrates a schematic structure a network structure of an evolved universal mobile telecommunication system (E-UTRAN) to which the present invention can be applied.

An E-UTRAN system is an evolved version of the UTRAN system. For example, the E-UTRAN may be also referred to as an LTE/LTE-A system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

Figure 2:
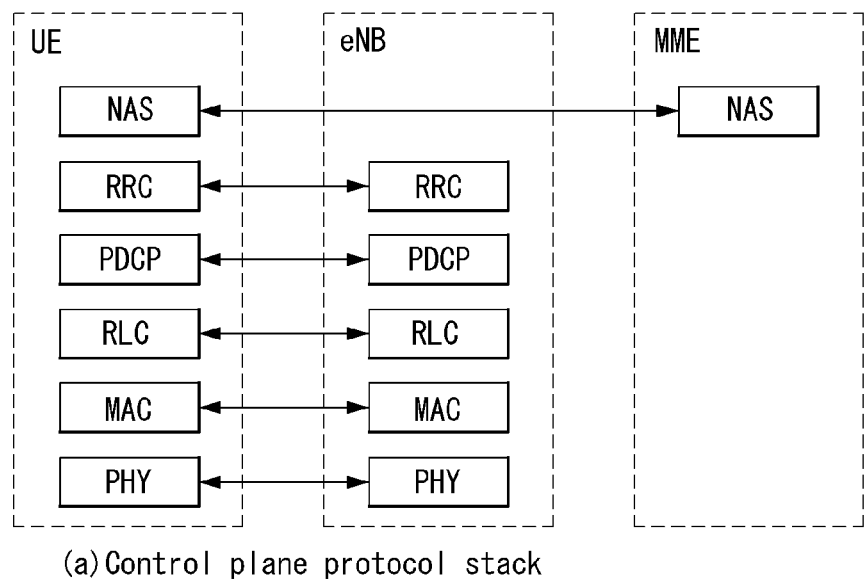
FIG. 2 illustrates a radio interface protocol structure between a UE and an E-UTRAN in the wireless communication system to which the present invention can be applied.
Figure 2:
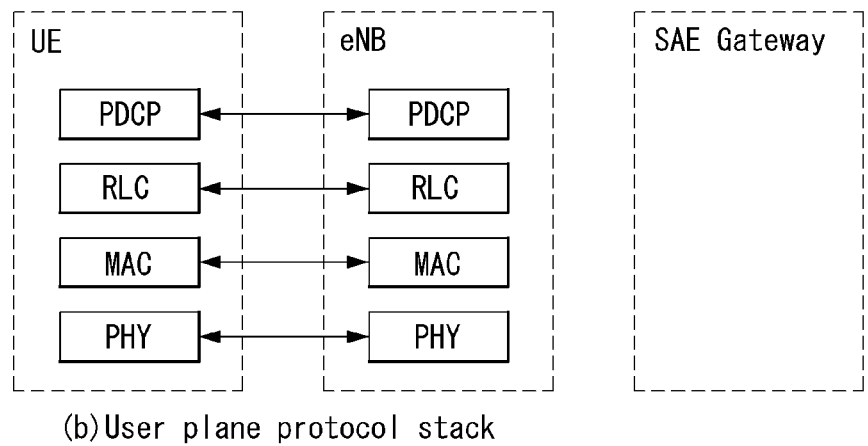

FIG. 2 illustrates the configurations of a control plane and a user plane of a radio interface protocol between the E-UTRAN and a UE in the wireless communication system to which the present invention can be applied. FIG. 2(a) shows the respective layers of the radio protocol control plane, and FIG. 2(b) shows the respective layers of the radio protocol user plane.

Referring to the FIG. 2, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

A physical layer (PHY) as a first layer (L1) provides an information transfer service to an upper layer by using a physical channel. The physical layer is connected to a medium access control (MAC) layer located at a higher level through a transport channel, and data is transmitted between the MAC layer and the physical layer through a transport channel. The transport channel is classified according to how the data is transmitted through the air interface. Data is transmitted between physical layers of the transmitting end and the physical end of the receiving end through a physical channel between different physical layers. The physical layer is modulated by an orthogonal frequency division multiplexing (OFDM) scheme, and uses time and frequency as radio resources.

There are several physical control channels used in the physical layer. The Physical downlink control channel (PDCCH) informs the terminal to resource allocation of paging channel (PCH) and downlink shared channel (DL-SCH) and HARQ (hybrid automatic repeat request) information related to uplink shared channel (UL-SCH). In addition, the PDCCH may grant an uplink grant (UL grant) indicating the resource allocation of the uplink transmission to the UE. The physical control format indicator channel (PDFICH) informs the terminal of the number of OFDM symbols used for PDCCHs and is transmitted every subframe. A physical HARQ indicator channel (PHICH) carries an HARQ ACK (acknowledge)/NACK (non-acknowledge) signal in response to an uplink transmission. A physical uplink control channel (PUCCH) carries uplink control information such as HARQ ACK/NACK for downlink transmission, a scheduling request, and a channel quality indicator (CQI). A physical uplink shared channel (PUSCH) carries a UL-SCH.

MAC layer includes a mapping and a multiplexing/demultiplexing function to a transport block provided as a physical channel on a transport channel of a MAC service data unit (SDU) belonging to a logical channel.

The RLC layer of the second layer (L2) supports reliable data transmission. The function of the RLC layer includes concatenation, segmentation and reassembly of the RLC SDUs. In order to guarantee various quality of service (QoS) required by a radio bearer (RB), the RLC layer provides three modes of operation of a transparent mode (TM), an unacknowledged mode (UM) and acknowledge mode. AM RLC provides error correction via automatic repeat request (ARQ). Meanwhile, when the MAC layer performs the RLC function, the RLC layer may be included as a functional block of the MAC layer.

The packet data convergence protocol (PDCP) layer of the second layer L2 performs user data transmission, header compression, and ciphering functions in the user plane. The header compression function is relatively large in order to efficiently transmit Internet protocol (IP) packets such as IPv4 (internet protocol version 4) or IPv6 (internet protocol version 6) through a wireless interface having a small bandwidth And a function of reducing an IP packet header size that contains unnecessary control information. The function of the PDCP layer in the control plane includes transmission of control plane data and encryption/integrity protection.

A radio resource control (RRC) layer located in the lowermost portion of the third layer L3 is defined only in the control plane. The RRC layer controls radio resources between the UE and the network. To do this, the UE and the network exchange RRC messages through the RRC layer. The RRC layer controls logical, transport and physical channels in connection with configuration, re-configuration and release of radio bearers. The radio bearer means a logical path provided by the second layer (L2) for data transmission between the UE and the network. Setting up the radio bearer means defining the characteristics of the radio protocol layer and channel to provide a specific service, and setting each specific parameter and operation method. The radio bearer can be further divided into a signaling radio bearer (SRB) and a data radio bearer (DRB). The SRB is used as a path for transmitting RRC messages in the control plane, and the DRB is used as a path for transmitting user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). Uplink transport channels for transmission of data from the UE to the network include a Random Access Channel (RACH) for transmission of initial control messages and an uplink SCH (UL-SCH) for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), and a Multicast Traffic Channel (MTCH).

An EMM-registered state (EMM-REGISTERED) and an EMM-unregistered state (EMM-DEREGISTERED) can be defined in order to manage the mobility of the terminal in the NAS layer located on the control plane of the terminal and the MME. The EMM registration state and the EMM deregistration state can be applied to the terminal and the MME. The initial terminal is in the EMM deregistration state as in the case where the terminal is first turned on and the terminal performs a process of registering with the network through an initial attach procedure in order to access the network. If the connection procedure is successfully performed, the terminal and the MME transition to the EMM registration state.

Also, an ECM connection state (ECM-CONNECTED) and an ECM idle state (ECM-IDLE) may be defined to manage a signaling connection between a terminal and a network. The ECM connection state and the ECM idle state may also be applied to the UE and the MME. The ECM connection is composed of an RRC connection established between the UE and the BS and an S1 signaling connection established between the BS and the MME. The RRC state indicates whether the RRC layer of the UE and the RRC layer of the BS are logically connected. That is, when the RRC layer of the UE and the RRC layer of the BS are connected, the UE is in the RRC connection state (RRC_CONNECTED). If the RRC layer of the UE and the RRC layer of the Node B are not connected, the UE is in the RRC idle state (RRC_IDLE).

The network can grasp the existence of the terminal in the ECM connected state in a cell unit and can effectively control the terminal. On the other hand, the network can not grasp the existence of the UEs in the ECM idle state, and manages the core network (CN) in a tracking area unit which is an area unit larger than the cell. When the terminal is in the ECM idle state, the terminal performs discontinuous reception (DRX: Discontinuous Reception) set by the NAS using the ID uniquely allocated in the tracking area. That is, the terminal may receive a broadcast of system information and paging information by monitoring the paging signal at a particular paging opportunity every terminal-specific paging DRX cycle. Also, when the terminal is in the ECM idle state, the network does not have context information of the terminal. Therefore, the terminal in the ECM idle state can perform the terminal-based mobility-related procedure such as cell selection or cell reselection without receiving the command of the network. When the location of the terminal is different from the location known by the network in the ECM idle state, the terminal can notify the location of the terminal to the network through a tracking area update (TAU) procedure. On the other hand, when the terminal is in the ECM connection state, the mobility of the terminal is managed by a command of the network. In the ECM connection state, the network knows the cell to which the UE belongs. Thus, the network can transmit and/or receive data to and from the terminal, control mobility such as terminal handover, and perform cell measurements on neighboring cells.

As described above, in order for the UE to receive a general mobile communication service such as voice or data, the UE needs to transition to an ECM-CONNECTED state. The UE is in the ECM-IDLE state like the case in which power of the UE is first turned on. When the UE is successfully registered in the corresponding network through an initial attach procedure, the UE and the MME transition to an ECM-CONNECTED state. Also, in a case in which the UE is registered in the network but traffic is deactivated so radio resource is not allocated, the UE is in an ECM-IDLE state, and when uplink or downlink new traffic is generated in the corresponding UE, the UE and the MME transition to an ECM-CONNECTED state through a service request procedure.

Figure 3:
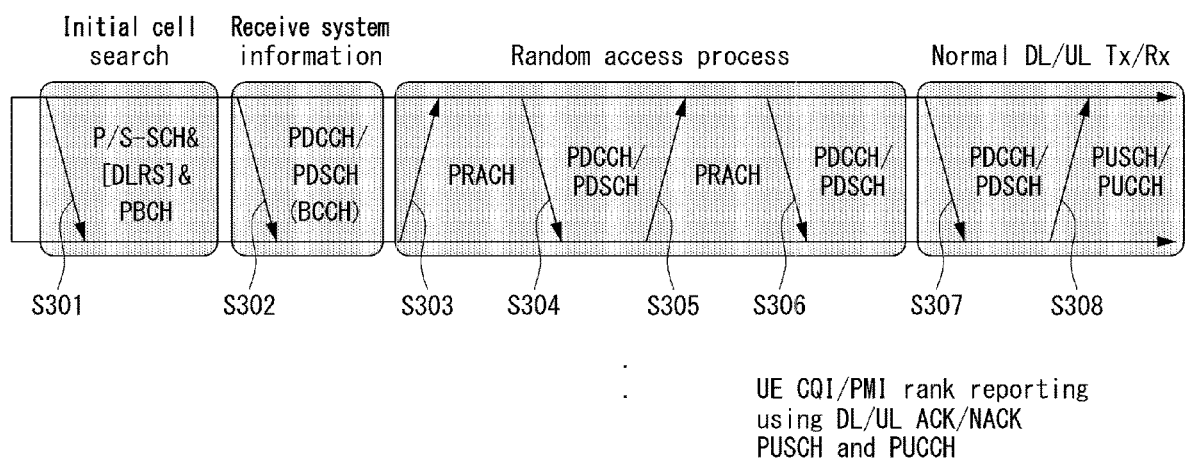
FIG. 3 is a diagram for describing physical channels and a general signal transmission method using them used in the 3GPP LTE/LTE-A system to which the present invention can be applied.

FIG. 3 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S301. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S302.

Thereafter, the UE may perform a random access procedure in steps S303 to S306, in order to complete the access to the BS. For the random access procedure, the UE may transmit a preamble via a Physical Random Access Channel (PRACH) (S303), and may receive a message in response to the preamble via the PDCCH and the PDSCH corresponding thereto (S304). In contention-based random access, a contention resolution procedure including the transmission of an additional PRACH (S305) and the reception of the PDCCH and the PDSCH corresponding thereto (S306) may be performed.

The UE which performs the above-described procedure may then receive the PDCCH/PDSCH (S307) and transmit a Physical Uplink Shared Channel (PUSCH)/Physical Uplink Control Channel (PUCCH) (S308), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), preceding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

Figure 4:
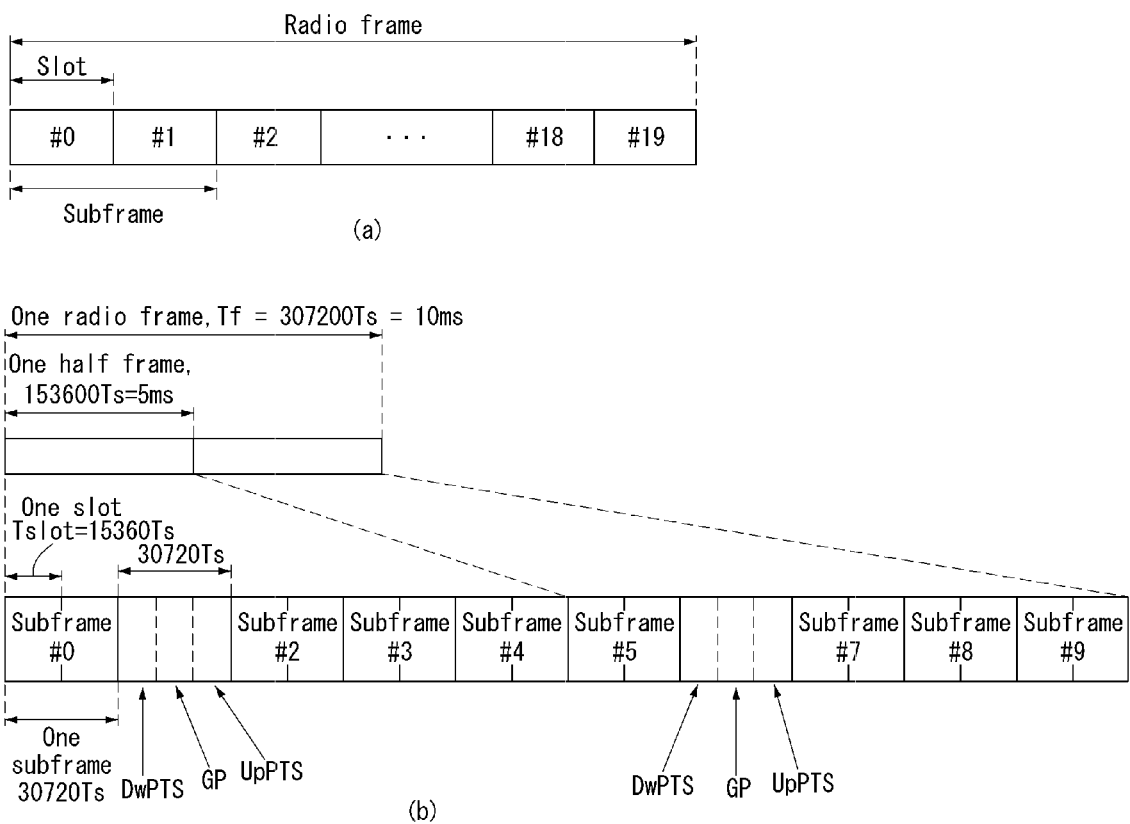
FIG. 4 is a diagram showing the structure of a radio frame used in a 3GPP LTE/LTE-A system to which the present invention can be applied.

FIG. 4 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 4(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 4(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path latency of a downlink signal between the uplink and the downlink.

The structure of the radio frame is only exemplary and the number of subframes included in the radio frame, the number of slots included in the subframe, or the number of symbols included in the slot may be variously changed.

Figure 5:
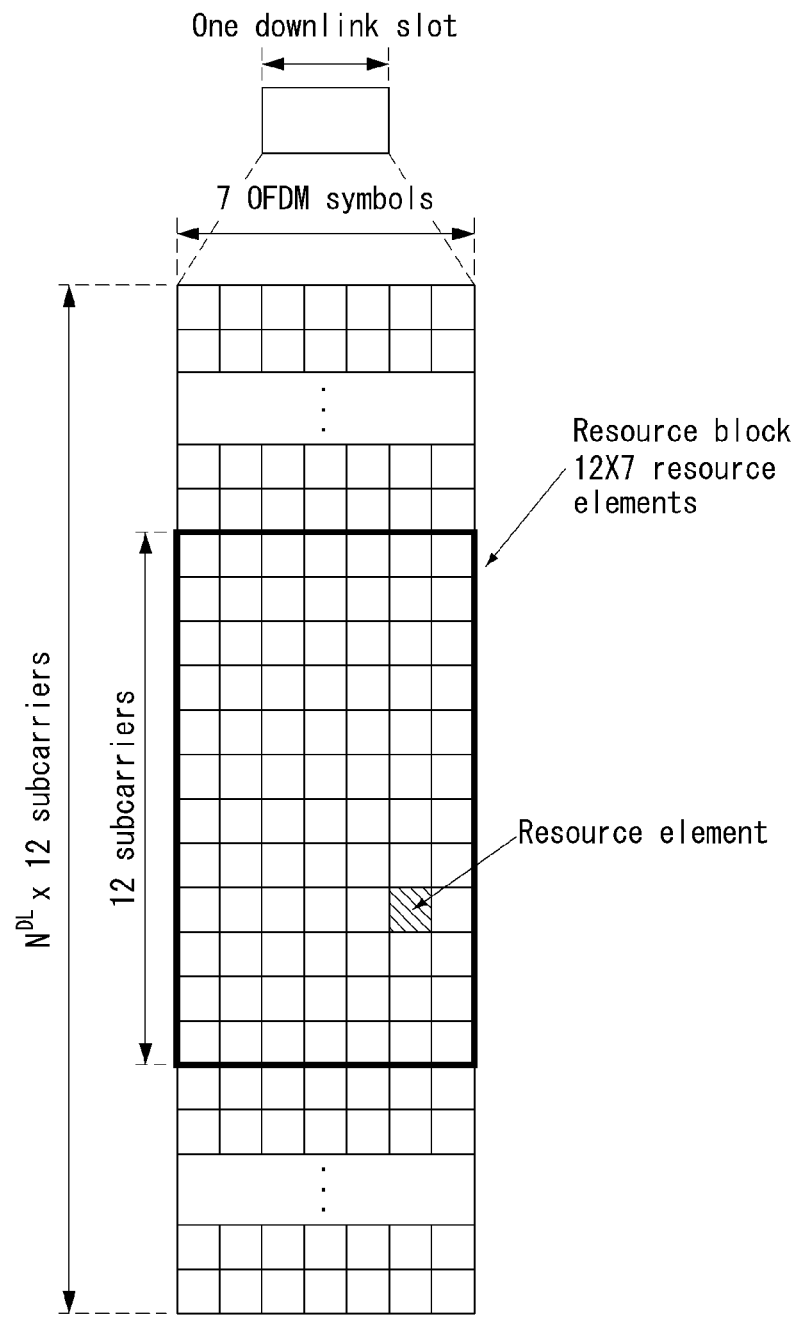
FIG. 5 shows an example of a resource grid for one downlink slot in the wireless communication system to which the present invention can be applied.

FIG. 5 shows an example of a resource grid for one downlink slot in the wireless communication system to which the present invention can be applied.

Referring to the FIG. 5, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k, l) in the slot. Here, k (k=0, . . . , NRB×12−1) denotes an index of subcarrier in the frequency domain, and l (l=0, . . . , 6) denotes an index of symbol in the time domain. The number NDL of resource blocks included in the downlink slot depends on a downlink transmission bandwidth determined in a cell.

Figure 6:
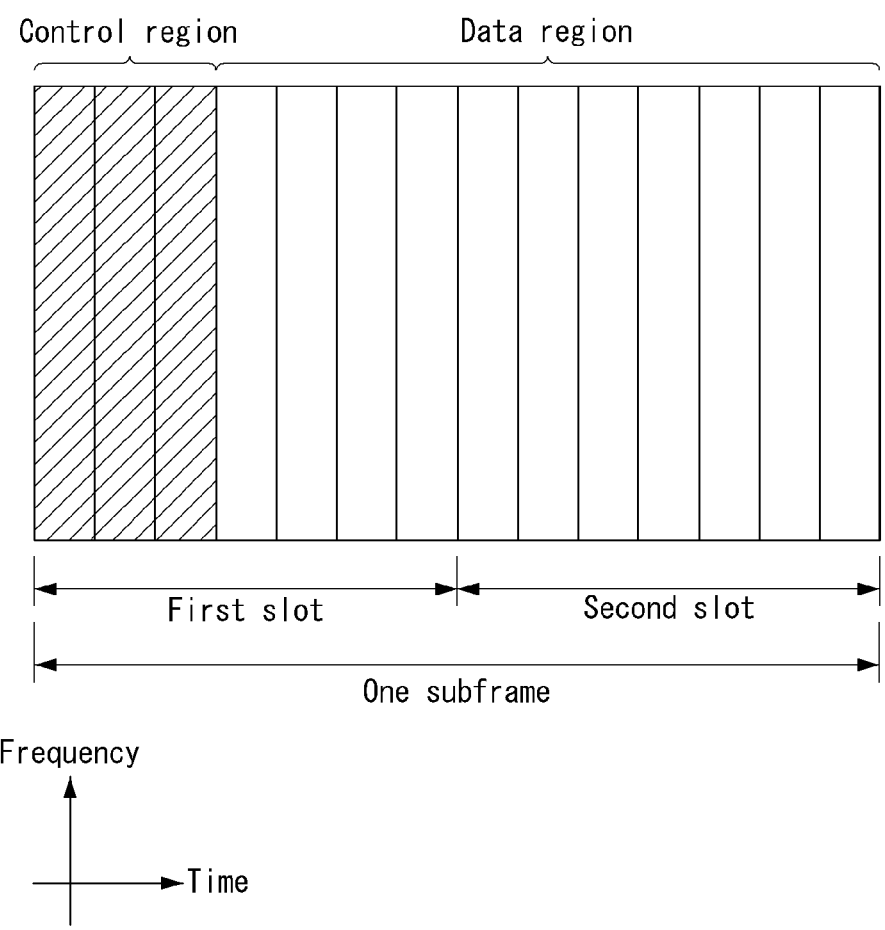
FIG. 6 shows a structure of a downlink subframe in the wireless communication system to which the present invention can be applied.

FIG. 6 shows a structure of a downlink subframe in the wireless communication system to which the present invention can be applied.

Referring to the FIG. 6, a maximum of three OFDM symbols located in a front portion of a first slot in a subframe correspond to a control region to be assigned with control channels. The remaining OFDM symbols correspond to a data region to be assigned with physical downlink shared channels (PDSCHs). Examples of downlink control channels used in the 3GPP LTE include a physical control format indicator channel (PCFICH), a physical downlink control channel (PDCCH), a physical hybrid-ARQ indicator channel (PHICH), etc.

The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

Figure 7:
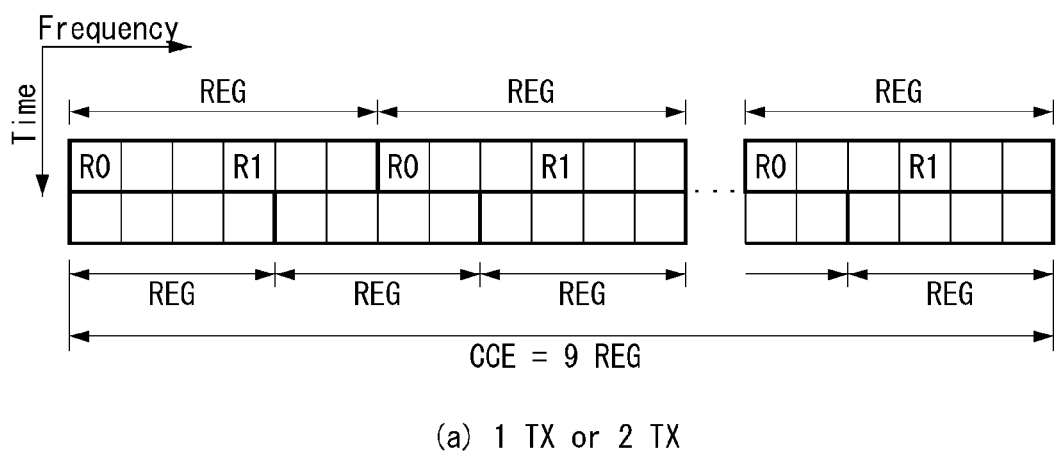
FIG. 7 is a diagram illustrating a resource unit used for configuring a downlink control channel in an LTE system.
Figure 7:
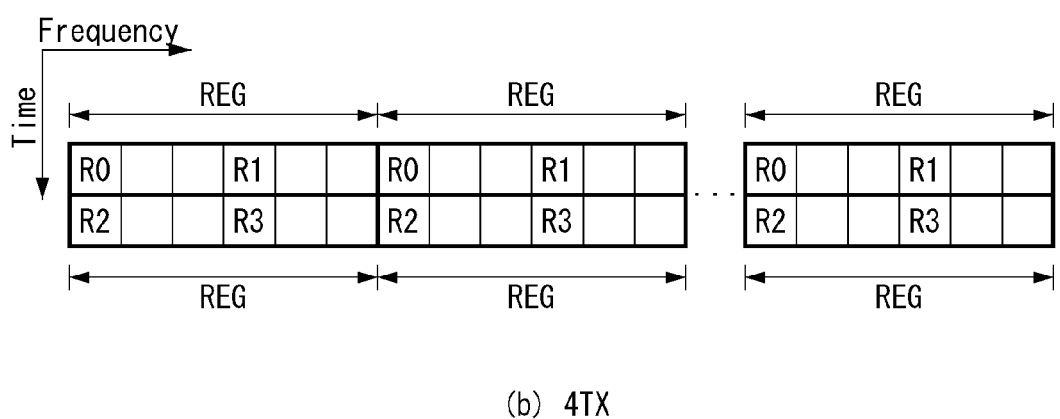

FIG. 7 is a diagram illustrating a resource unit used for configuring a downlink control channel in an LTE system.

Referring to FIG. 7, FIG. 7(a) illustrates a case where the number of transmit antennas of the BS is 1 or 2 and FIG. 7(b) illustrates a case where the number of transmit antennas of the base station is 4. Only the reference signal (RS) pattern is different according to the number of transmit antennas and the setting method of the resource unit related to the control channel is the same.

As illustrated in FIG. 7, a basic resource unit of the downlink control channel is a resource element group (REG). The PCFICH and the PHICH described in FIG. 6 include four REGs and three REGs, respectively. The PDCCH is configured in units of control channel elements (CCEs) and one CCE includes 9 REGs.

The UE is configured to check M(L) (≥L) CCEs arranged consecutively or in a specific rule in order to check whether a PDCCH constituted by L CCEs is transmitted to the UE. Plural L values may be provided, which the UE should consider for PDCCH reception. The set of CCEs that the UE should check for the PDCCH reception is called a search space.

Table 1 below shows an example of the search space.

TABLE 1

| | Search space $S_k^{(L)}$ | | Number of PDCCH candidates $M^{(L)}$ | DCI formats |
|---|---|---|---|---|
| Type | Aggregation level L | Size [in CCEs] | | |
| UE-specific | 1 | 6 | 6 | 0, 1, 1A, 2B, 1D, 2, 2A, 2B, 4 |
| | 2 | 12 | 6 | |
| | 4 | 8 | 2 | |
| | 8 | 16 | 2 | |
| Common | 4 | 16 | 4 | 0, 1A, 1C, 3, 3A |
| | 8 | 16 | 2 | |

In Table 1, a CCE aggregation level L represents the number of CCEs constituting the PDCCH, $S_k^{(L)}$ represents the search space of the CCE aggregation level L, and $M^{(L)}$ represents the number of candidate PDCCHs to be monitored in the search space of the aggregation level L.

The search space may be divided into a UE-specific search space which only a specific UE is allowed to access and a common search space which all UEs in the cell are allowed to access. The UE monitors a common search space with CCE aggregation levels of 4 and 8 and monitors a UE-specific search space with CCE aggregation levels of 1, 2, 4 and 8. The common search space and the UE-specific search space may overlap with each other.

In addition, a position of a first CCE (having the smallest index) in the PDCCH search space assigned to an arbitrary UE with respect to each CCE aggregation level value changes every subframe according to the UE. This is called PDCCH search space hashing.

The CCE may be distributed in the system band. More specifically, a plurality of logically consecutive CCEs may be input to an interleaver and the interleaver performs a function of interleaving the plurality of input CCEs in units of the REG. Therefore, frequency/time resources constituting one CCE are physically distributed in the entire frequency/time domain within the control region of the subframe. Consequently, although the control channel is configured in units of the CCE, the interleaving is performed in units of the REG, thereby maximizing the frequency diversity and interference randomization gain.

Figure 8:
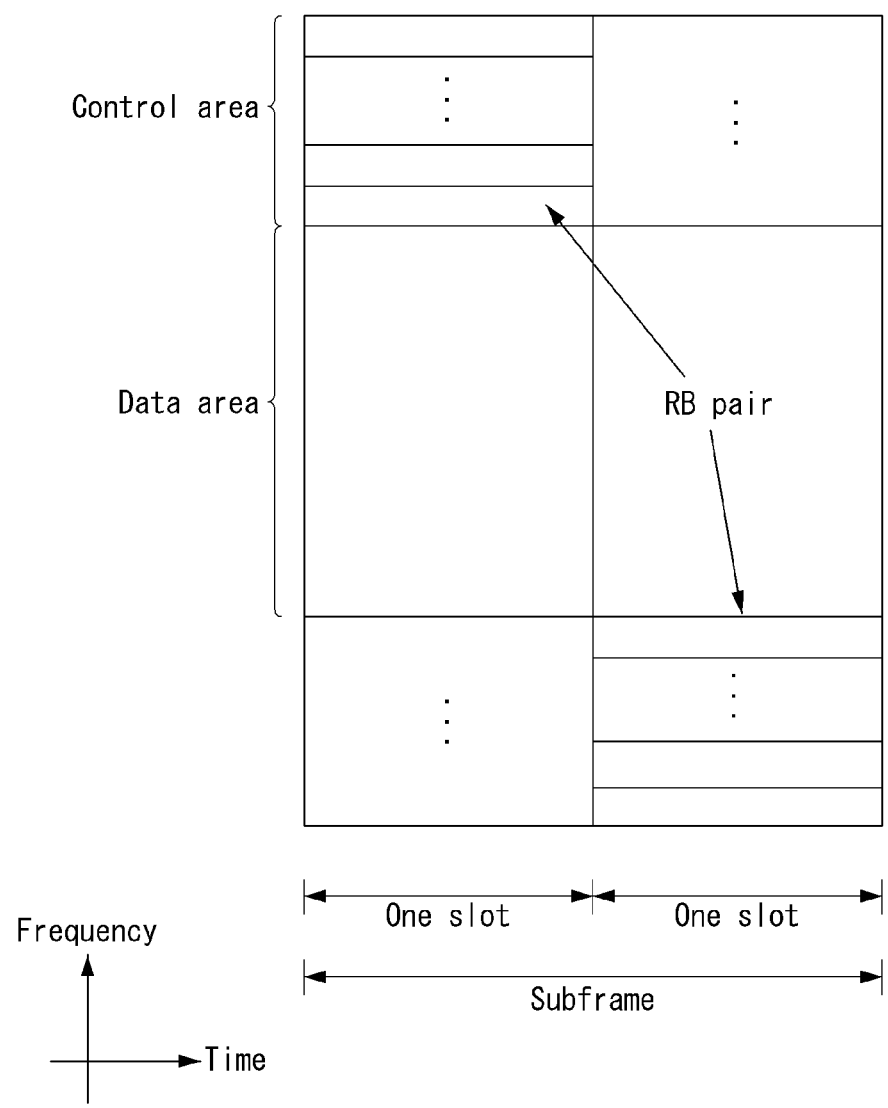
FIG. 8 illustrates an architecture of an uplink subframe in a wireless communication system to which the present invention may be applied.

FIG. 8 illustrates an architecture of an uplink subframe in a wireless communication system to which the present invention may be applied.

Referring to FIG. 8, the uplink subframe may be divided into the control region and the data region in the frequency domain. The PUCCH carrying the uplink control information is allocated to the control region. The PUSCH carrying the user data is allocated to the data region. When the data region is indicated by the upper layer, the UE may support simultaneous transmission of the PUSCH and the PUCCH. The resource block pair within the subframe is allocated to the PUCCH for one UE. The resource blocks which belong to the resource block pair allocated to the PUCCH occupy different subcarriers in two slots, respectively based on a slot boundary. In this case, the resource block pair allocated to the PUCCH frequency-hops in the slot boundary.

Physical Downlink Control Channel (PDCCH)

Control information transmitted through the PDCCH is referred to as a downlink control indicator (DCI). The size and the purpose of the control information vary according to the DCI format and the PDCCH may vary in size according to a coding rate.

Table 2 shows the DCI depending on the DCI format.

TABLE 2

| DCI format | Objectives |
| --- | --- |
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 2, the DCI includes format, format 0 for PUSCH scheduling, format 1 for scheduling one PDSCH codeword, format 1A for compact scheduling of one PDSCH codeword, format 1C for simple scheduling, format 2 for PDSCH scheduling in a closed-loop spatial multiplexing mode, format 2A for PDSCH scheduling in an open loop spatial multiplexing mode, formats 3 and 3A for transmission of a transmission power control (TPC) command, and format 4 for PUSCH scheduling in one uplink cell in a multi-antenna port transmission mode.

DCI format 1A may be used for PDSCH scheduling regardless of which transmission mode is set in the UE.

Such DCI format may be independently applied for each UE and the PDCCHs of multiple UE in one subframe may be simultaneously multiplexed. The PDCCH is configured by one control channel element or an aggregation of several consecutive control channel elements (CCEs). The CCE is a logical allocation unit used to provide the PDCCH with the coding rate according to a state of a radio channel. The CCE is a unit corresponding to nine sets of REGs consisting of four resource elements. The BS may use {1, 2, 4, 8} CCEs in order to configure one PDCCH signal and {1, 2, 4, 8} in this case is called a CCE aggregation level. The number of CCEs used for transmission of a specific PDCCH is decided by the BS according to the channel state. The PDCCH configured according to each UE is interleaved and mapped into a control channel region of each subframe according to a CCE-to-RE mapping rule. The location of the PDCCH may vary depending on the number of OFDM symbols for the control channel of each subframe, the number of PHICH groups, a transmission antenna, and a frequency transition.

As described above, channel coding is independently performed on the PDCCH of each multiplexed UE and the cyclic redundancy check (CRC) is applied. The CRC is masked with a unique identifier (UE ID) of each UE to allow the UE to receive the PDCCH thereof. However, in the control region allocated in the subframe, the BS does not provide information on where the corresponding PDCCH is located to the UE. Since the UE may not know at which position, at which CCE aggregation level or DCI format the PDCCH of the UE is transmitted in order to receive the control channel transmitted from the BS, the UE monitors an aggregation of PDCCH candidates in the subframe to find the PDCCH of the UE. This is called blind decoding (BD). The blind decoding may be referred to as blind detection or blind search. The blind decoding refers to a method in which the UE de-masks the CRC part with the UE ID and then checks a CRC error to verify whether the corresponding PDCCH is the control channel of the UE.

Buffer Status Reporting (BSR)

Figure 9:
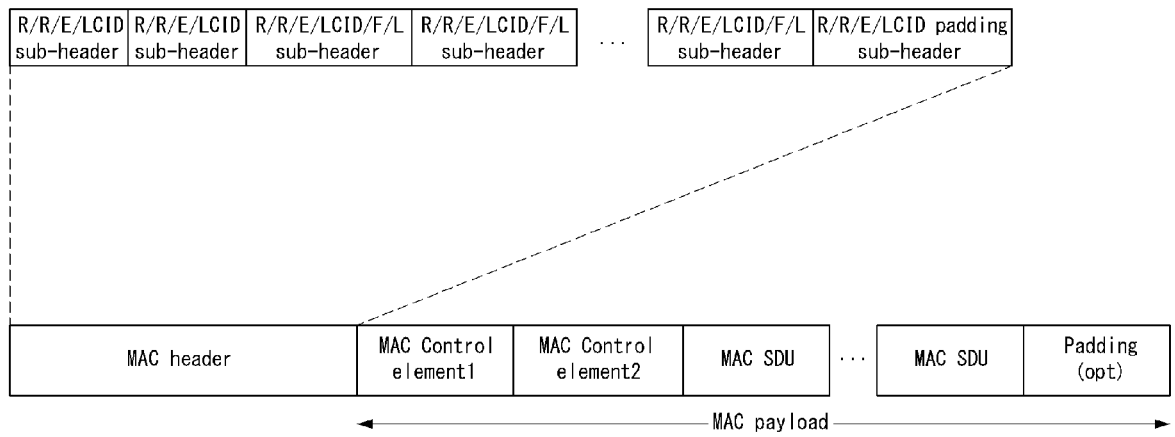
FIG. 9 is a diagram exemplifying an MAC PDU used in an MAC entity in the wireless communication system to which the present invention may be applied.

FIG. 9 is a diagram exemplifying an MAC PDU used in an MAC entity in the wireless communication system to which the present invention may be applied.

Referring to FIG. 9, an MAC PDU may include a MAC header, at least one MAC service data unit (SDU), and at least one MAC control element, and further include padding. In some cases, at least one of the MAC SDU and the MAC control element may not be included in the MAC PDU.

As illustrated in the example of FIG. 9, it is general that the MAC control element precedes the MAC SDU. In addition, the size of the MAC control element may be fixed or variable. When the size of the MAC control element is variable, it may be determined whether the size of the MAC control element is extended through an extended bit. The size of the MAC SDU may also be variable.

The MAC header may include one or more sub-headers. In this case, at least one sub-header included in the MAC header corresponds to each of the MAC SDU, the MAC control element, and the padding, and the order of the sub-headers is the same as an arrangement order of the corresponding elements. For example, when the MAC PDU includes MAC control element 1, MAC control element 2, a plurality of MAC SDUs, and the padding, in the MAC header, a sub-header corresponding to MAC control element 1, a sub-header corresponding to MAC control element 2, a plurality of sub-headers corresponding to the plurality of MAC SDUs, respectively, and a sub-header corresponding to the padding may be arranged in order.

The sub-header included in the MAC header may include six header fields. Specifically, the sub-header may include six header fields of R, R, E, LCID, F, and L.

With respect to a sub-header corresponding to the MAC control element having the fixed size and a sub-header corresponding to a last data field among data fields included in the MAC PDU, sub-headers including four header fields may be used. When the sub-header includes four fields as described above, four fields may be R, R, E, and LCID.

Figure 10:
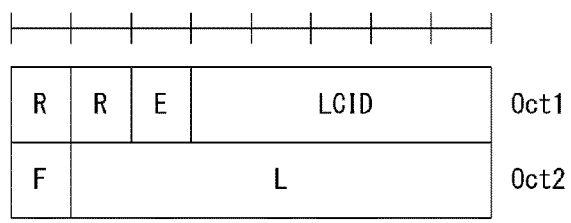
FIGS. 10 and 11 exemplify a sub header of the MAC PDU in the wireless communication system to which the present invention may be applied.
Figure 10:
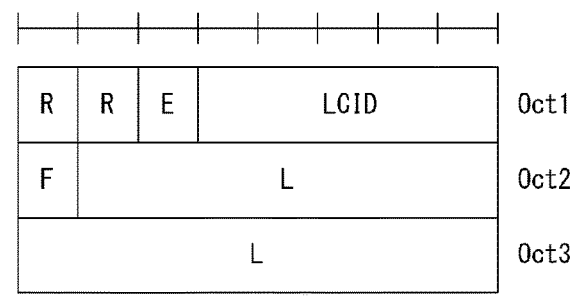
Figure 11:
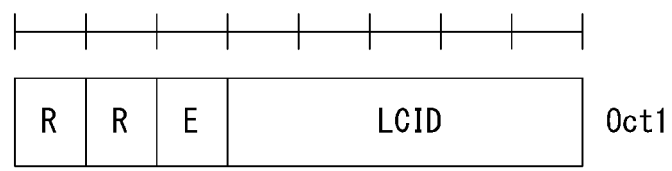

FIGS. 10 and 11 exemplify a sub header of the MAC PDU in the wireless communication system to which the present invention may be applied.

Referring to FIGS. 10 and 11, each field will be described below.

1) R: Represents a reserved bit and an unused bit.

2) E: as an extended field, represents whether to extend an element corresponding to the sub-header. For example, when the E field is '0', the element corresponding to the sub-header ends without iteration and when the E field is '1', the element corresponding to the sub-header is repeated one more time and a length may be extended by two.

3) LCID: A logical channel identification field is to identify a logical channel corresponding to the corresponding MAC SDU or identify types of the corresponding MAC control element and padding. When the sub-header is associated with the MAC SDU, it is indicated to which logical channel the MAC SDU corresponds and when the sub-header is the MAC control element, it is indicated which MAC control element the corresponding MAC control element is.

Table 3 shows the value of the LCID for the DL-SCH.

TABLE 3

| Index | LCID values |
|---|---|
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 4 shows the value of the LCID for the DL-SCH.

TABLE 4

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In the LTE/LTE-A system, the UE may report a buffer status thereof to the network by setting any one index value of truncated BSR, short BSR, and long BSR.

A mapping relationship between the index and the LCID value exemplified in Tables 3 and 4 is exemplified for easy description and the present invention is not limited thereto.

4) F: as a format field, represents the size of the L field.

5) L: as a length field, represents the sizes of the MAC SDU and the MAC control element corresponding to the sub-header. When the size of the MAC SDU or MAC control element corresponding to the sub-header is equal to or larger than 127 bits, a 7-bit L field may be used (FIG. 14(a)) and in other cases, a 15-bit L field may be used (FIG. 14(b)). When the MAC control element has a variable size, the size of the MAC control element may be defined through the L field. When the size of the MAC control element is fixed, the size of the MAC control element may be determined even if the size of the MAC control element is not defined in the L field, so that the F and L fields may be omitted as illustrated in FIG. 15.

Figure 12:
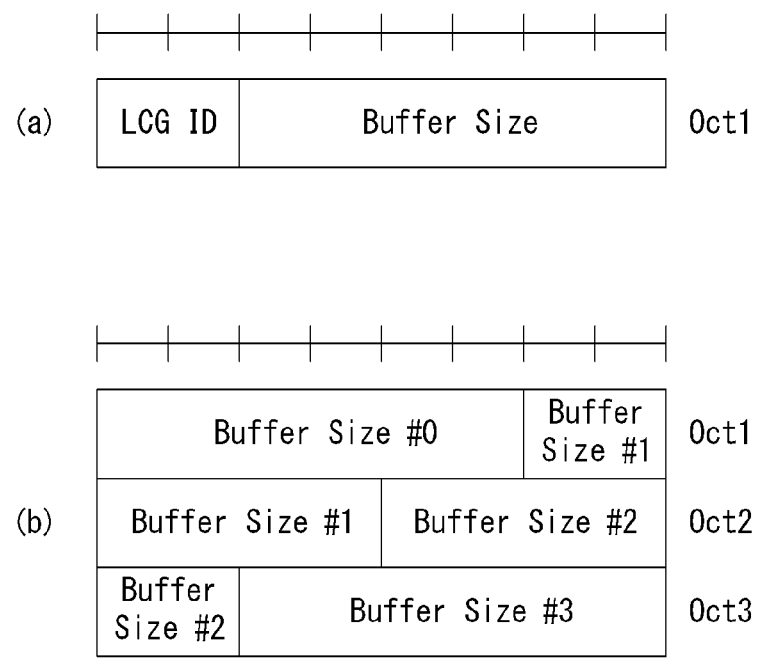
FIG. 12 is a diagram exemplifying a format of an MAC control element for reporting a buffer status in the wireless communication system to which the present invention may be applied.

FIG. 12 is a diagram exemplifying a format of an MAC control element for reporting a buffer status in the wireless communication system to which the present invention may be applied.

When the truncated BSR and the short BSR are defined in the LCID field of the sub-header, the MAC control element corresponding to the sub-header may be configured to include one logical channel group identification (LCG ID) field and one buffer size field indicating a buffer status of the logical channel as illustrated in the example of FIG. 12(a). The LCG ID field is for identifying a logical channel group to which the buffer status is to be reported, and the LCG ID field may have a size of 2 bits.

The buffer size field is for identifying the total amount of data available for all logical channels belonging to the logical channel group after the MAC PDU is generated. The usable data includes all data that may be transmitted by the RLC layer and the PDCP layer and the amount of data is represented by the number of bytes. In this case, the sizes of the RLC header and the MAC header may be excluded when computing the amount of data. The buffer size field may have a size of 6 bits.

When the long BSR is defined in the LCID field of the sub-header, the MAC control element corresponding to the sub-header may include four buffer size fields indicating 4 groups of buffer statuses having LCG IDs of 0 to 3 as illustrated in FIG. 12(b). Each buffer size field may be used for identifying a total data mount usable for each of different logical channel groups.

Uplink Resource Allocation Procedure

In the 3GPP LTE/LTE-A system, a scheduling-based data transmission/reception method of the BS is used to maximize utilization of resources. This means that when there is data to be transmitted by the UE, the BS may firstly request the uplink resource allocation to the BS and transmit data using only the uplink resources allocated from the BS.

Figure 13:
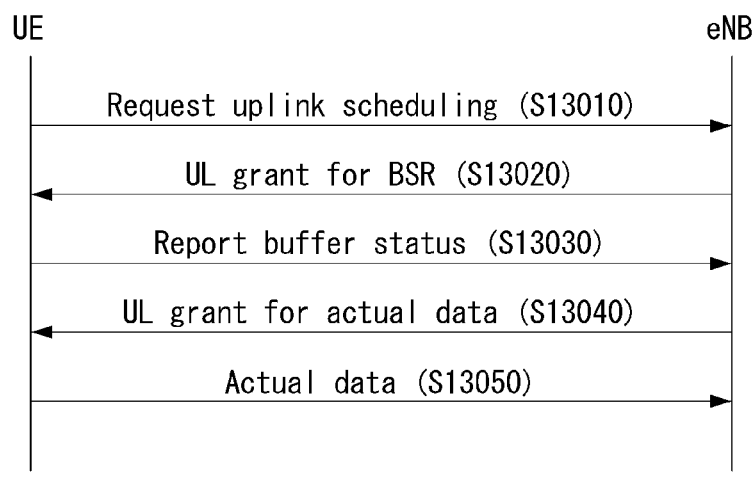
FIG. 13 is a diagram exemplifying an uplink resource allocation process of a user equipment in the wireless communication system to which the present invention may be applied.
Figure 13:
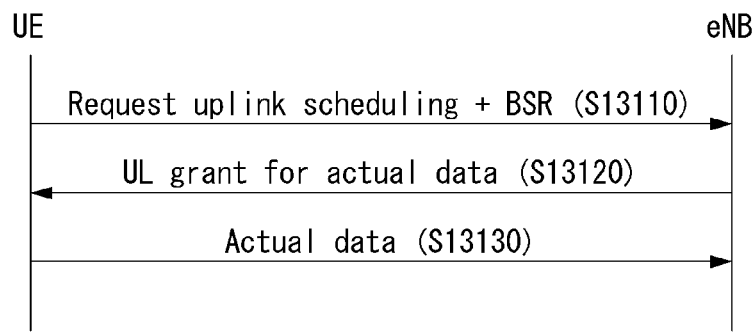

FIG. 13 is a diagram exemplifying an uplink resource allocation process of a user equipment in the wireless communication system to which the present invention may be applied.

In order to efficiently use the uplink radio resource, the BS needs to know what types of data and how much data is to be transmitted on the uplink for each UE. Accordingly, the UE may directly transmit information on uplink data to be transmitted to the BS and the BS may allocate the uplink resource to the UE based on the information. In this case, the information on the uplink data transmitted from the UE to the BS is referred to as a buffer status report (BSR) as the amount of the uplink data stored in a buffer. The BSR is transmitted using a MAC control element when the UE is allocated resources on the PUSCH in the current TTI and a reporting event is triggered.

FIG. 13(a) exemplifies an uplink resource allocation process for actual data when an uplink radio resource for buffer status reporting (BSR) is not allocated to the UE. That is, since a UE switching a state of an active mode in a DRX mode has no data resource which is allocated in advance, the UE needs to request the resource for the uplink data starting from SR transmission through the PUCCH and in this case, an uplink resource allocation procedure of 5 steps is used.

Referring to FIG. 13(a), when a PUSCH resource for transmitting the BSR is not allocated to the UE, the UE first transmits the scheduling request (SR) to the BS in order to allocate the PUSCH resource (S13010).

A reporting event occurs in the scheduling request, but when the UE does not schedule the radio resource onto the PUSCH at a current TTI, the scheduling request is used for the UE to request the PUSCH resource in order to be allocated the PUSCH resource for uplink transmission. That is, the UE transmits the SR on the PUCCH when a regular BSR is triggered but does not have the uplink radio resource for transmitting the BSR to the BS. The UE transmits the SR through the PUCCH or initiates the random access procedure according to whether the PUCCH resource for the SR is configured. Specifically, the PUCCH resource in which the SR may be transmitted is configured by the upper layer (e.g., RRC layer) in a UE-specific manner. The SR configuration includes SR periodicity and SR offset information.

When receiving a UL grant for the PUSCH resource for the BSR transmission from the BS (S13020), the UE transmits the BSR triggered through the PUSCH resource allocated by the UL grant to the BS (S13030).

The BS checks the amount of data to be transmitted on the uplink by the actual BS through the BSR and transmits the UL grant for the PUSCH resource for the actual data transmission to the UE (S13040). The UE receiving the UL grant for the actual data transmission transmits actual uplink data to the BS through the allocated PUSCH resource (S13050).

FIG. 13(b) exemplifies an uplink resource allocation process for actual data when the uplink radio resource for the BSR is allocated to the UE.

Referring to FIG. 13(b), when the PUSCH resource for transmitting the BSR is already allocated to the UE, the UE transmits the BSR through the allocated PUSCH resource and transmits the scheduling request to the BS together with the BSR (S13110). Next, the BS verifies the amount of data which the actual UE is to transmit on the uplink through the BSR and transmits the UL grant for the PUSCH resource for the actual data transmission to the UE (S13120). The UE receiving the UL grant for the actual data transmission transmits the actual uplink data to the BS through the allocated PUSCH resource (S13130).

Figure 14:
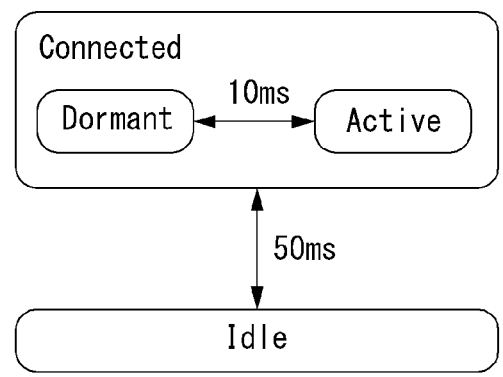
FIG. 14 is a diagram for describing a latency time in a control plane (C-Plane) required in 3GPP LTE-A to which the present invention may be applied.
Figure 15:
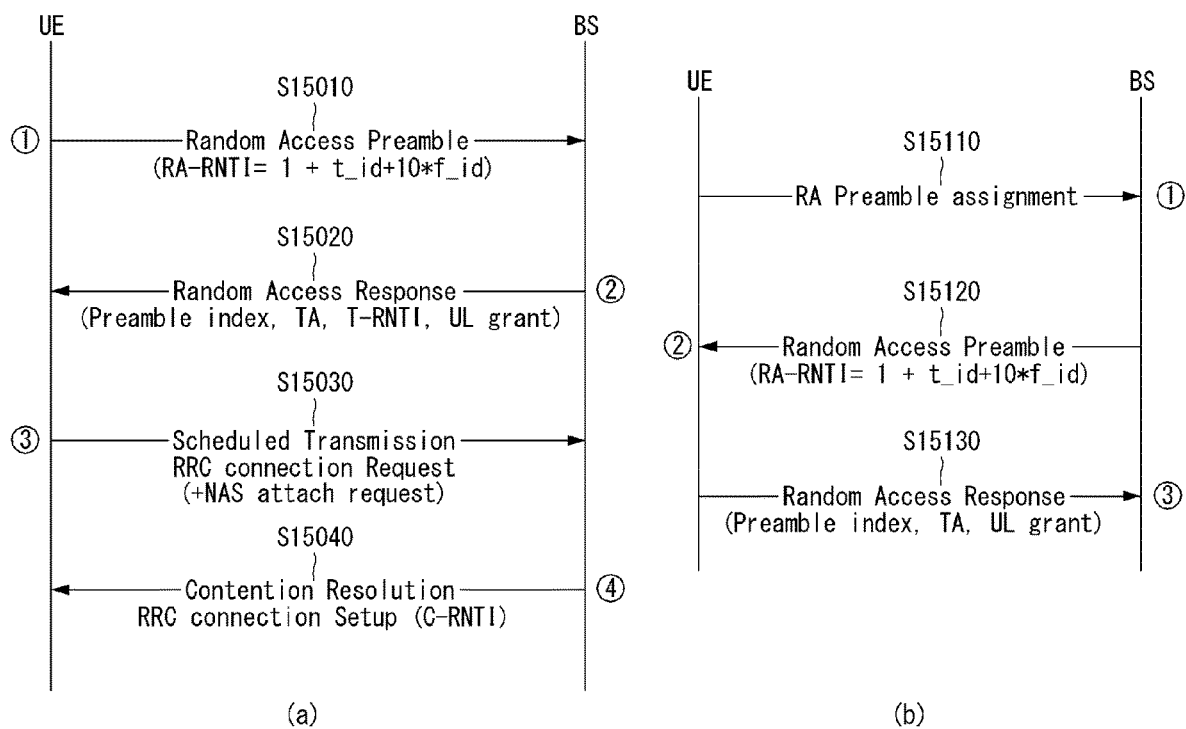
FIG. 15 is a diagram illustrating an example of a random access procedure to which the present invention may be applied.

FIG. 14 is a diagram for describing a latency time in a control plane (C-Plane) required in 3GPP LTE-A to which the present invention may be applied.

Referring to FIG. 14, the 3GPP LTE-A requests that a transition time from an idle mode (IP address allocated state) to a connected mode be 50 ms or less. In this case, the transition time includes a setting time of a user plane (U-Plane) (excluding a S1 transfer latency time). Further, in the connected mode, the transition time from a dormant state to an active state is required to be 10 ms or less.

The transition from the dormant state to the active state may occur in four scenarios as below.

In the case of a synchronized UE, uplink initiated transition (synchronized)

In the case of au unsynchronized UE, uplink initiated transition (unsynchronized)

In the case of the synchronized UE, downlink initiated transition (synchronized)

In the case of the unsynchronized UE, downlink initiated transition (unsynchronized)

Random Access Procedure (RACH Procedure)

FIGS. 15(a) and 15(b) illustrate an example of a random access procedure in an LTE system.

The random access procedure is performed at the initial access in the RRC_IDLE, the initial access after the radio link failure, handover requesting the random access procedure, and the uplink or downlink data generation requiring the random access procedure during the RRC_CONNECTED. Some RRC messages including an RRC connection request message, a cell update message, an UTRAN registration area (URA) update message, and the like are also transmitted by using the random access procedure. A logical channel common control channel (CCCH), a dedicated control channel (DCCH), and a dedicated traffic channel (DTCH) may be mapped to a transport channel RACH. The transport channel RACH is mapped to a physical random access channel (PRACH).

When the MAC layer of the UE instructs a UE physical layer to transmit the PRACH, the UE physical layer first selects one access slot and one signature and transmits A PRACH preamble to the uplink. The random access procedure is divided into a contention-based random access procedure and a non-contention based random access procedure.

FIG. 15(a) illustrates an example of a contention based random access procedure and FIG. 15(b) illustrates an example of a non-contention based random access procedure.

First, the contention-based random access procedure will be described with reference to FIG. 15(a).

The UE receives and stores information on the random access from the base station through the system information. Thereafter, when the random access is required, the UE transmits a random access preamble (also referred to as message 1) to the base station (S15010).

When the BS receives the random access preamble from the UE, the BS transmits a random access response message (also referred to as message 2) to the UE (S15020). Specifically, downlink scheduling information for the random access response message may be CRC-masked with a random access-radio network temporary identifier (RA-RNTI) and transmitted on an L1 or L2 control channel (PDCCH). The UE receiving the downlink scheduling signal masked with the RA-RNTI may receive and decode the random access response message from a physical downlink shared channel (PDSCH). Thereafter, the UE checks whether the random access response information indicated to the UE exists in the random access response message.

Whether there is the random access response information indicated to the UE may be confirmed by whether there is a random access preamble ID (RAID) for the preamble transmitted by the UE.

The random access response information includes timing alignment (TA) indicating timing offset information for synchronization, radio resource allocation information used in the uplink, temporary ID (e.g., temporary C-RNTI) for terminal identification, and the like.

When receiving the random access response information, the UE performs uplink transmission (also referred to as message 3) on the uplink shared channel (S-SCH) according to the radio resource allocation information included in the response information (S15030). Here, the uplink transmission may be expressed as scheduled transmission.

After receiving the uplink transmission from the UE, the BS transmits a message (also referred to as message 4) for contention resolution to the UE through a downlink shared channel (DL-SCH) (15040).

Next, the non-contention based random access procedure will be described with reference to FIG. 15(b).

Before the UE transmits the random access preamble, the BS allocates a non-contention random access preamble to the UE (S15110).

The non-contention random access preamble may be allocated through a handover command or dedicated signaling such as the PDCCH. When the UE is allocated the non-contention random access preamble, the UE transmits the non-contention random access preamble allocated to the BS (S15120).

Thereafter, the BS may transmit the random access response (also referred to as message 2) to the UE similar to step S2102 in the contention based random access procedure (S15130).

In the random access procedure described above, the HARQ is not applied to the random access response, but the HARQ may be applied to a message for uplink transmission or contention resolution for the random access response. Therefore, the UE does not need to transmit the ACK or NACK for the random access response.

First, a UL data transmission method in an LTE(-A) or 802.16 system will be described in brief.

A cellular system such as the LTE(-A) system or the 802.16m system uses a BS scheduling-based resource allocation scheme.

When there is data (i.e., UL data) to be transmitted to the BS by the UE in a system using the BS scheduling-based resource allocation scheme, the UE requests to the BS a resource for the corresponding data transmission before transmitting the data to the BS.

As described above, requesting to the BS the resource for the data transmission is referred to as a scheduling request.

Such a scheduling request by the UE may be performed through scheduling request (SR) transmission to the PUCCH or buffer status report (BSR) transmission to the PUSCH.

In addition, when resources to transmit the SR or BSR are not allocated to the UE from the BS, the UE may request the uplink resource to the BS through an RACH procedure.

The BS that receives the scheduling request from the UE allocates the uplink resource to be used by the corresponding UE to the UE through a downlink control channel (i.e., an UL grant message and a DCI for LTE(-A)).

The downlink control channel may be the PDCCH.

In this case, the UL grant transmitted to the UE through the PDCCH may be notified by explicitly signaling to which subframe resource the resource allocated to the UE corresponds, but the resource is allocated to a subframe after a specific time (e.g., 4 ms in the case of the LTE) to define an appointed time between the UE and the BS.

That is, the base station allocates the resources to the UE after Xms (e.g., 4 ms in the case of the LTE(-A)) because of consideration of both a time of receiving and decoding the UL grant and a time of preparing and encoding the uplink data to be transmitted by the UE.

Figure 16:
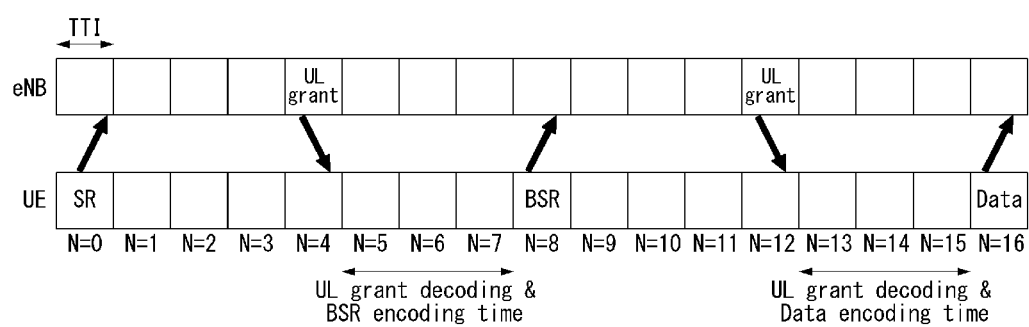
FIGS. 16 and 17 are diagrams illustrating an example of a method for transmitting actual data through a scheduling request and a BSR procedure.

FIG. 16 is a diagram illustrating a time required for the UE to transmit actual data through a 5-step scheduling request procedure using a PUCCH SR resource.

As illustrated in FIG. 16, the UE may transmit the actual uplink data after approximately 17 ms from the time when the SR signal is transmitted.

In this case, the SR resource allocated to the UE may be allocated on the PUCCH with a specific period and may be allocated with a period of at least 1 ms to a maximum of 80 ms.

Here, when it is assumed that an SR having a period of 1 ms is allocated to the UE, an average time for the UE to wait for the PUCCH resource for SR transmission is 0.5 ms and the latency time until data transmission to the BS through the scheduling request is 17.5 ms.

When there is an uplink resource allocated in advance by the UE from the BS, the UE may transmit a resource request for newly generated data using the previously allocated resource.

Alternatively, the UE may request additional uplink resources to the BS by transmitting the BSR together with the data transmitted in the resources previously allocated.

Figure 17:
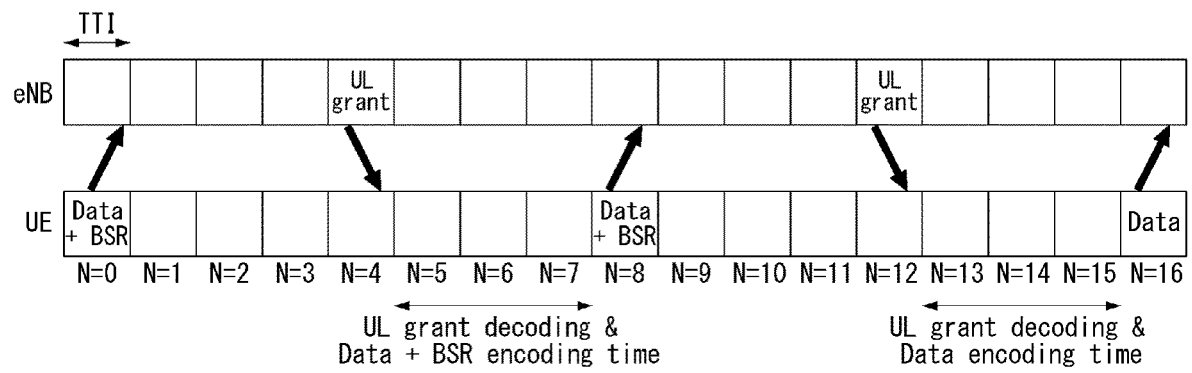

In this case, as illustrated in FIG. 17, it can be seen that a latency of 9 ms occurs until the UE transmits the uplink data to the BS after transmitting the BSR to the BS.

When the UE does not have the PUCCH SR resource or the PUSCH resource allocated from the BS or the uplink synchronization does not match, the UE may request resources for the newly generated data using the RACH procedure.

Figure 18:
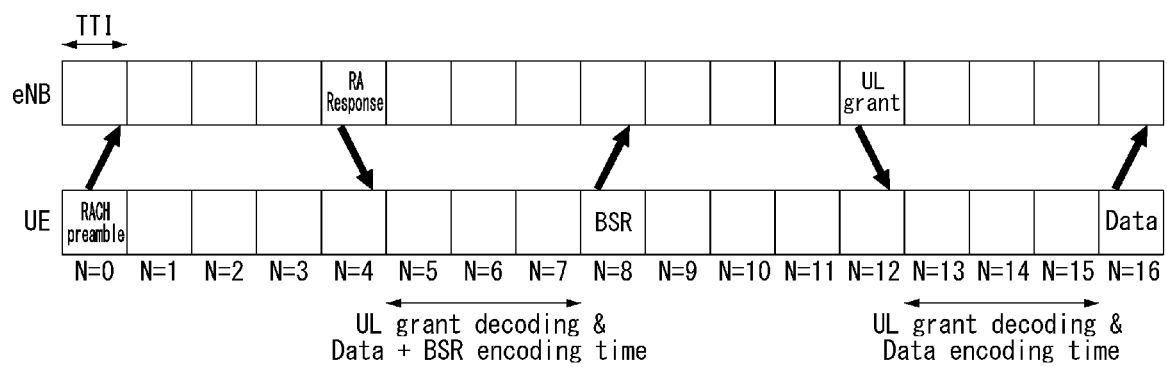
FIG. 18 is a diagram illustrating an example of a method for transmitting actual data through an RACH procedure.

In this case, as illustrated in FIG. 18, it can be seen that a latency of 17 ms occurs until the UE transmits the uplink data to the BS after transmitting the RACH preamble to the BS.

In this case, the PRACH resource capable of transmitting the RACH preamble may be configured with a specific period for each cell.

Assuming that the PRACH resource has a period of at least 1 ms, an average data transmission latency of 17.5 ms may occur.

As illustrated in FIGS. 16 to 18, the UE experiences a latency of at least 9 ms to at most 17.5 ms in order to transmit the uplink data.

This is advantageous in that the BS may maximize resource efficiency by allocating resources optimal to channel conditions of the UEs, but the latency occurs in UL data transmission of the UEs.

5G communications are increasingly required to support a variety of real-time application services such as healthcare, traffic safety, disaster safety, and remote medical control.

Therefore, the 5G communications aim to build an ultra low latency system that has extremely short response time so that users may not notice awkwardness even if the users provide touch information which is most sensitive to the latency time of human five senses on the Internet (target latency: E2E or Radio 1 ms).

In order to provide such a 5G communication service, the latency of data transmission should be minimized.

However, data transmission in a current system is designed to additionally cause the following latency.

Downlink Data Transmission Latency

Connected UE: 0 ms (no latency)

Dormant UE: Occurrence of average latency of 1 ms to 1280 ms according to DRX cycle set for UE (short DRX cycle: 2 to 640 ms and long DRX cycle: 10 to 2560 ms)

Idle UE: Occurrence of average latency of 160 ms to 1280 ms+initial access latency according to paging DRX cycle set for UE (paging cycle: 320 to 2560 ms and initial access: 50 ms to 100 ms)

Uplink Data Transmission Latency

Synchronized & dormant UE: Latency occurrence of 17.5 ms (5-step SR)

Unsynchronized UE: Latency occurrence of 17.5 ms (SR through RACH)

Connected UE to which uplink resource is allocated: 9 ms (data transmission through BSR transmission)

As described above, various latencies may occur depending on the state of the UE in order for the UE to transmit/receive data and in particular, the latency of the DL data reception may cause a latency in various lengths for the dormant or idle state UE.

However, this is one of measures to reduce power consumption of the UE, and it is necessary to closely examine the relationship between the data reception latency and the power consumption.

However, it can be confirmed that the data transmission latency in the uplink data transmission is caused by the use of the data transmission scheme based on the BS scheduling even though the UE may transmit the data when needed.

The 5G communications anticipates as a purpose of a primary service to prevent a secondary accident or rapidly cope with an urgent situation by notifying the BS, neighboring UEs, or user of information regarding an accident or a state that may be caused by a specific event at a time unpredictable from various end users such as human or machine (a car or a sensor).

Such a low latency service mainly allows the uplink data to be transmitted quickly so that a subsequent procedure may be performed.

Therefore, fast transmission of the uplink data, which is an initiation phase of the service, is one of the main factors affecting the latency of the entire service.

For the above reasons, latency in uplink data transmission is considered to be an essential factor for supporting the low latency service of new 5G communication.

Hereinafter, a method for transmitting the uplink data (UL data) in order to support the low latency service in new 5 generation (G) communication proposed in this specification will be described in detail with reference to the related drawings.

The UL data transmission method proposed in this specification may be largely performed through a 3-step scheme as follows.

1 step: transmission of urgent signal of UE
2 step: reception of urgent signal of BS and transmission of urgent acknowledgment signal to UEs
3 step: transmission of urgent message (or urgent data) of UE The UL data transmission method using the 3-step scheme will be described in detail with reference to FIGS. 18 to 20.

The 3-step UL data transmission method proposed in this specification may be widely used or applied to a method for rapidly transmitting the UL data related to the urgent situation, but not limited thereto, and a method for quickly transmitting data such as short data.

Figure 19:
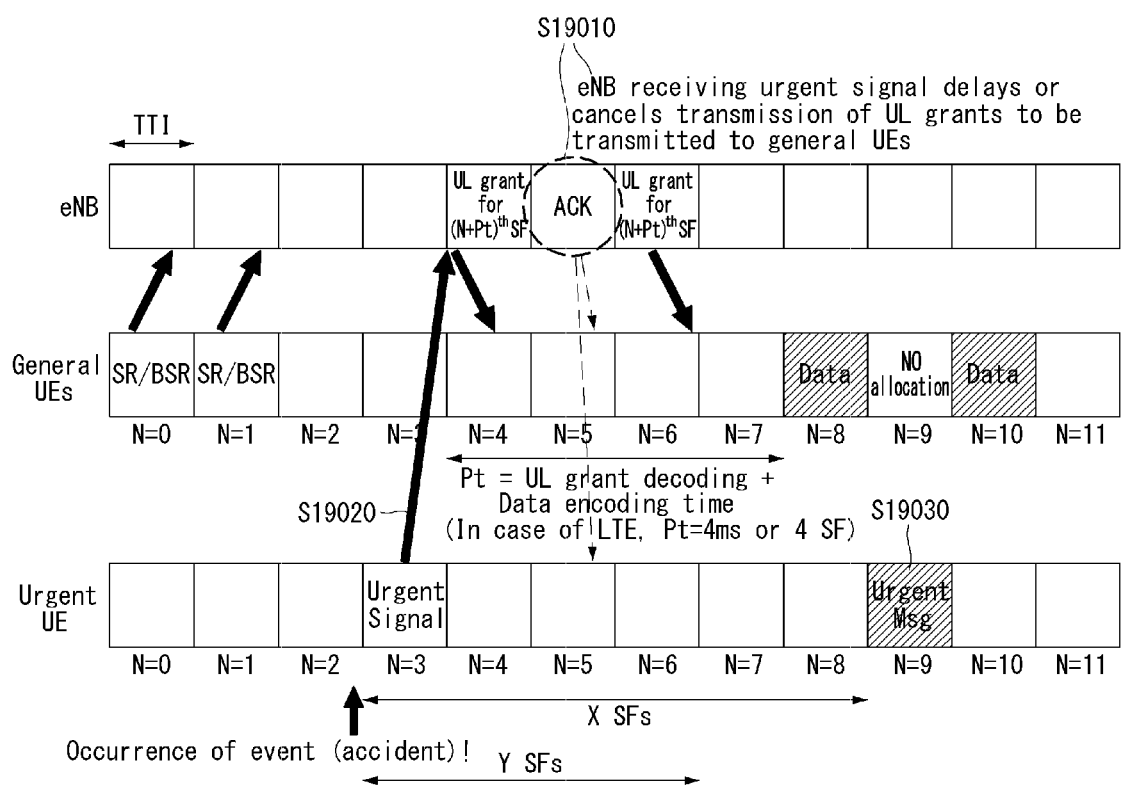
FIG. 19 is a diagram illustrating an example of a method for transmitting uplink data proposed by this specification.

FIG. 19 is a diagram illustrating an example of a method for transmitting uplink data proposed by this specification.

First, a first UE transmits an urgent signal to the BS (S1810).

The first UE indicates a UE capable of transmitting low latency service related data and may be expressed as an urgent UE.

For convenience of description, the first UE and the urgent UE are mixed.

The low latency service, as mentioned above, may refer to services mainly related to healthcare, traffic safety, disaster safety, and remote medical control, which are currently being discussed in the 5G communications.

In a wireless communication system supporting such a low latency service, a specific UE quickly informs the BS, neighboring UEs, users, and the like of information regarding an accident or a state that may be caused by a specific event to allow persons to prevent a secondary accident or rapidly cope with an urgent situation.

The urgent signal is a signal for the first UE to detect the occurrence of the urgent situation and inform the base station of the occurrence of the urgent situation.

The first UE may transmit the urgent signal to the BS using (1) an ON/OFF keying scheme or (2) a new physical channel (e.g., physical urgent CH: PUCH).

A transmission method of the urgent signal, that is, concrete methods of (1) and (2) will be described later.

Thereafter, when the BS receives the urgent signal from the first UE, the BS may transmit a response to the urgent signal to the first UE and/or a second UE.

The response to the emergency signal may be expressed as an urgent acknowledgment signal, an urgent ACK signal, or the like.

Here, the second UE may refer to general UEs in a cell that does not transmit data for the low latency service.

Further, the BS may transmit the response to the urgent signal to the first UE and the second UE in a broadcast scheme.

Alternatively, the BS may unicast the response to the urgent signal only to the first UE or the second UE.

Specifically, when the BS receives the urgent signal from the first UE, the BS may support the urgent message transmission to the urgent UE by operating in three following forms (S1820).

Postponing or canceling UL grant transmission scheduled to be transmitted to second UE Postponing or canceling UL grant transmission to second UE (method ①) and transmitting response (urgent ACK signal) to urgent signal to first UE and/or second UE Transmitting response to urgent signal to first UE and/or second UE After the operation of any of the three forms of the BS, the first UE transmits the urgent message to the BS and/or neighboring UEs.

The urgent message may be expressed as urgent data or urgent PUSCH.

Specifically, the first UE transmits the urgent signal in an Nth subframe (SF #N) and transmits the urgent message to the BS and/or neighboring UEs in a subframe (subframe #N+X) after X subframes from SF #N (S1830).

The urgent signal is generated by the specific event such as the urgent situation and the specific event may occur in the SF #N to which the urgent signal is transmitted or in SF prior to SF #N.

Next, each of the steps of the 3-step method for supporting the urgent message transmission of the UE will be described in more detail.

Urgent Signal Transmission Method

First, a first step (step S19010 in FIG. 19), that is, an urgent signal transmission method of the first UE will be described.

When the first UE (urgent UE) detects the occurrence of the specific event such as the urgent situation, the first UE transmits the urgent signal to the BS in order to transmit urgent information or the urgent message related to the generated specific event.

The urgent signal may be used not only to notify the BS immediately of the occurrence of the specific event related to the urgent situation, but also to secure a resource for transmitting the urgent message including detailed information of the occurring specific event.

Therefore, the urgent signal may refer to a signal which the urgent UE transmits to the BS in order to receive a resource allocation for transmitting the urgent message, that is, a UL grant from the BS.

The urgent signal may be transmitted through (1) an ON/OFF keying scheme or (2) a new physical channel (e.g., physical urgent channel: PUCH).

Here, the urgent signal may be expressed as an urgent sequence.

Further, the resource for transmitting the urgent signal may be configured for each event or for each UE.

Hereinafter, a method for configuring the resource for transmitting the urgent signal for each event and transmitting the urgent signal by using the ON/OFF keying scheme or new physical urgent channel (PUCH) through the configured resource and a method for configuring the resource for transmitting the urgent signal for each UE and transmitting the urgent signal by using the ON/OFF keying scheme or new physical urgent channel (PUCH) through the configured resource will be separately described.

Method for Configuring Urgent Signal Transmission Resource for Each Event and Transmitting Urgent Signal First, a method for configuring a resource for transmitting the urgent signal for each event is described.

An urgent event which may occur will be defined in advance in order to transmit the urgent signal. Here, the urgent event may be expressed as '$E_n$'.

Here, n represents an integer value greater than zero.

The BS may allocate a specific resource (e.g., PUCCH resource) or a specific sequence (e.g., PUCH sequence) as many as the number (n) of urgent events that may be defined in advance so that the urgent UE may transmit the urgent signal.

Here, information on a specific resource (i.e., PUCCH US or PUCH) for transmitting the urgent signal may be defined differently for each cell.

The specific resource or specific sequence may indicate resource allocation information for urgent signal transmission.

The resource allocation information for transmitting the urgent signal may be transmitted to UEs in the cell through a broadcast message such as System information (SIB2) or a radio resource control (RRC) message.

Alternatively, when it is desired to transmit the resource allocation information for transmitting the urgent signal only to the urgent UE capable of transmitting a specific urgent signal (according to a system definition), the BS transmits the urgent signal only to the urgent UE in a unicast or multicast scheme.

Here, the event that may occur or may be used for the urgent signal transmission may be as shown in Table 5 below and may be defined as a total of n events from event 0 to event (n−1).

In addition, each event may be defined in advance in the cell as shown in Table 5 below, and may be defined differently for each cell.

Further, the information related to the event may be transmitted together with a message for transmitting the detailed information on the urgent signal or may be defined in advance according to the system.

TABLE 5

| Event | Description |
|---|---|
| 0 | Inter-vehicle collision |
| 1 | Road slippage |
| 2 | Vehicle overturning |
| 3 | Vehicle fire |
| 4 | Heart attack |
| 5 | Blood pressure risk |
| 6 | Excessive bleeding |
| ... | |
| n − 1 | Others |

That is, for each event defined as shown in Table 5, a specific resource or a specific sequence for urgent signal transmission may be mapped in advance.

Next, a method for transmitting the urgent signal through the ON/OFF keying scheme based on the transmission resources of the urgent signal configured for each event will be described.

When the urgent signal is transmitted through the ON/OFF keying scheme, the BS allocates PUCCH resources of a number equal to the number (n) of events in a specific transmission time interval (TTI) or a specific subframe according to the urgent event defined in the cell.

An RRC information element including resource information related to the urgent signal transmission may be defined as follows.

When the urgent signal is transmitted using a physical layer structure of LTE(-A), PUCCH format 1 may be reused for transmission of the urgent signal.

In this case, the urgent signal (US) may be used instead of the scheduling request (SR) of the PUCCH.

That is, the following items for the RRC information element may be defined and the RRC information element may include US resource allocation information, US configuration information, US signaling information, and the like.

When only the US is transmitted, the urgent signal (US) is transmitted using PUCCH format 1

US Resource Allocation Information

When the US resource for each event defined in the cell is configured by a unicast message, the resource of the US may be set up or released through an RRC Connection Reconfig. (Radio Resource Config. Dedicated (Physical Config. Dedicated (US config)) message.

Alternatively, when the US resource for each event defined in the cell is configured by a unicast message, the resource of the US may be set up or released through System Information Block Type2 (Radio Resource Config Common (US config)).

Further, when the urgent signal is transmitted using the LTE(-A) physical layer structure, US resources for up to 2048 events (0, . . . , 2047) may be allocated in one subframe.

Alternatively, when the urgent signal is transmitted using a short TTI having a length smaller than the TTI (14 symbols) of the LTE(-A) system, the number of events that may be allocated in one (short) subframe may be smaller than 2048 according to the allocated resource.

US Configuration Information

US periodicity may be set according to a US configuration index and US subframe offset may also be set according to the index.

US Signaling

The urgent UE may transmit the US to the BS through a simple On-Off Keying (O.O.K) scheme.

D(0)=1: Preempt a PUSCH resource of (N+X)th subframe (positive US)

D(0) means data, D(0)=1 (positive value) indicates transmission of specific data, and D(0)=0 (negative value) indicates no transmission of specific data.

That is, D(0)=1 indicates that the urgent signal is transmitted and the PUSCH resource of the N+Xth SF (SF #N+X) is preallocated so that the urgent message may be transmitted.

Here, N represents the number of a subframe transmitting the US.

Transmitting nothing: indicates that the urgent signal is not transmitted (negative US).

The transmitting nothing may be expressed as D(0)=0.

The following is an example of the UrgentSignalConfig information element.

UrgentSignalConfig Information Element

```
-- ASN1START
    UrgentSignalConfig ::=        CHOICE {
        release
    NULL,
        setup
    SEQUENCE {
```

```
            us-evnet0-PUCCH-ResourceIndex
    INTEGER (0..2047),
            us-evnet0-ConfigIndex
        INTEGER (0..157),
            us-evnet1-PUCCH-ResourceIndex
    INTEGER (0..2047),
            us-evnet1-ConfigIndex
        INTEGER (0..157),
        ...
            us-evnet(n-1)-PUCCH-ResourceIndex
    INTEGER (0..2047),
            us-evnet(n-1)-ConfigIndex
        INTEGER (0..157),
        }
    }
        -- ASN1STOP
```

Accordingly, when an urgent event having a mapping relationship with each US resource occurs, the urgent UE transmits the US with power loaded from the US resource mapped to the urgent event which occurs in order to inform the BS of the occurring urgent event.

That is, the BS may quickly identify what type of urgent event occurs through the receipt of the urgent signal at a specific resource.

Next, a method for transmitting the urgent signal through a new physical channel (e.g., Physical Urgent CH, PUCH) based on transmission resources of the urgent signal configured for each event will be described.

Here, the urgent signal may be expressed even as the urgent sequence.

This method newly defines the physical urgent channel (PUCH) for transmitting the urgent sequence in the PUSCH resource.

That is, when the specific event such as the urgent situation occurs, the urgent UE transmits the urgent sequence to the BS through the PUCH mapped to the occurring specific event.

In this case, by mapping the event information defined in the system or the cell to the specific sequence or the PUCH, when the BS receives a specific urgent sequence from the urgent UE, it may be quickly know what event occurs.

Here, the urgent sequence may means the urgent signal or a PUCH in which the urgent signal is transmitted.

The physical urgent channel (PUCH) may be defined in a method similar to a physical random access channel (PRACH).

First, the PRACH occupies 6 resource blocks (RBs) in the resource structure of the LTE(-A) system and a subcarrier interval is 1.25 kHz (format #4 is 7.5 kHz).

In addition, the PRACH may have 64 preamble sequences in each cell.

Each preamble sequence consists of a ZC sequence of length 839 (format #4 has a length of 139).

Specifically, the urgent sequence is defined to have a sequence number smaller than the number (64) of preamble sequences defined in the PRACH and a specific urgent event may be mapped to each urgent sequence.

Alternatively, a specific range (0 to 63) of the PRACH preamble may be preallocated as an urgent sequence for urgent signal transmission.

Method for Configuring Urgent Signal Transmission Resource for Each UE and Transmitting Urgent Signal Next, a method for configuring the resource for transmitting the urgent signal for each UE and transmitting the urgent signal through the configured resource will be described in detail.

In the case of allocating the resource for urgent signal transmission for each UE, the BS may recognize a specific UE (urgent UE) immediately by receiving the urgent signal, thereby quickly allocating an UL grant (uplink resource) to the specific.

As described above, the method for transmitting the urgent signal by the urgent UE may include (1) transmitting the urgent signal through the ON/OFF keying scheme or (2) transmitting the urgent sequence through the new physical channel (e.g., physical urgent CH (PUCH)).

First, a method for transmitting the urgent signal through the ON/OFF keying scheme by the urgent UE based on the transmission resources of the urgent signal configured for each event will be described.

The BS may allocate PUCCH resources as many as the number n of urgent UEs in a specific TTI (or a specific subframe) according to the urgent UE connected in the cell so that the urgent UE may transmit the urgent signal through the ON/OFF keying scheme.

The BS may transmit resource information related to the urgent signal transmission to the urgent UE and/or the general UE, that is, UEs in the cell, in the RRC information element.

The RRC information element may be defined as follows.

Here, the urgent signal may be transmitted using the physical layer structure of the LTE(-A) system. In this case, the US may be transmitted by reusing PUCCH format 1.

In this case, the urgent signal (US) may be used instead of the scheduling request (SR) of the PUCCH.

That is, the following items for the RRC information element may be defined and the RRC information element may include US resource allocation information, US configuration information, US signaling information, and the like.

When only the US is transmitted, the urgent signal (US) is transmitted using PUCCH format 1

US Resource Allocation Information

When the US resource for each event defined in the cell is configured to a unicast message, the resource of the US may be set up or released through an RRC Connection Reconfig. (Radio Resource Config. Dedicated (Physical Config. Dedicated (US config)) message.

Alternatively, when the US resource for each event defined in the cell is configured by a unicast message, the resource of the US may be set up or released through System Information Block Type2 (Radio Resource Config Common (US config)).

Further, when the urgent signal is transmitted using the LTE(-A) physical layer structure, US resources for up to 2048 events (0, . . . , 2047) may be allocated in one subframe.

Alternatively, in the case of using a short TTI having a length smaller than the TTI (14 symbols) of the LTE(-A) system, the number of events that may be allocated in one (short) subframe may be smaller than 2048 according to the allocated resource.

US Configuration Information

US periodicity may be set according to a US configuration index and US subframe offset may also be set according to the index.

US Signaling

The urgent UE may transmit the US to the BS through a simple On-Off Keying (O.O.K) scheme.

D(0)=1: Preempt a PUSCH resource of (N+X)th subframe (positive US)

D(0) means data, D(0)=1 (positive value) indicates transmission of specific data, and D(0)=0 (negative value) indicates no transmission of specific data.

That is, D(0)=1 indicates that the urgent signal is transmitted and the PUSCH resource of the N+Xth SF (SF #N+X) is preallocated so that the urgent message may be transmitted.

Here, N represents the number of a subframe transmitting the US.

Transmitting nothing: indicates that the urgent signal is not transmitted (negative US).

The transmitting nothing may be expressed as D(0)=0.

The following is another example of the UrgentSignal-Config information element.

UrgentSignalConfig Information Element

```
-- ASN1START
    UrgentSignalConfig ::=    CHOICE {
        release
NULL,
        setup
SEQUENCE {
            us-PUCCH-ResourceIndex
INTEGER (0..2047),
            us-ConfigIndex
INTEGER (0..157),
        }
    }
-- ASN1STOP
```

When the urgent event occurs, the urgent UE transmits the urgent signal with power loaded on the resource allocated for transmitting the urgent signal to the BS to inform the BS of the occurrence of the urgent event.

Accordingly, the BS recognizes that the urgent event occurs in the urgent UE and allocates a specific SF (No transmission SF) as the resource for the urgent message transmission of the urgent UE.

Next, a method for transmitting the urgent signal through a new physical channel (e.g., Physical Urgent CH, PUCH) based on transmission resources of the urgent signal configured for each UE will be described.

Here, the urgent signal may be expressed even as the urgent sequence.

That is, a new method in which by newly defining a physical urgent channel (PUCH) for transmitting the urgent sequence in the PUSCH resource, the urgent UE in which the urgent situation occurs may quickly transmit the sequence allocated thereto will be described.

When the urgent UE enters the cell, the BS may allocate a specific sequence for the urgent signal transmission to the urgent UE so that the BS may quickly identify in which UE the urgent situation occurs through the reception of the specific sequence.

That is, the BS may recognize the urgent UE immediately by receiving the allocated sequence by allocating the sequence in advance to the UE that may be defined as the urgent UE.

The physical urgent channel (PUCH) may be defined in a method similar to a physical random access channel (PRACH).

First, the PRACH occupies 6 resource blocks (RBs) in the resource structure of the LTE(-A) system and a subcarrier interval is 1.25 kHz (format #4 is 7.5 kHz).

In addition, the PRACH may have 64 preamble sequences in each cell.

Each preamble sequence consists of a ZC sequence of length 839 (format #4 has a length of 139).

Specifically, the urgent sequence is defined to have a sequence number smaller than the number (64) of preamble sequences defined in the PRACH and each urgent sequence may be mapped for each urgent UE.

Alternatively, a specific range (0 to 63) of the PRACH preamble may be preallocated as an urgent sequence for urgent signal transmission.

Reception of Urgent Signal of BS and Transmission of Response to Urgent Signal

Next, an operation of receiving and processing the urgent signal by the BS, that is, a second step (step S19020 of FIG. 19) in a 3-step method will be described in detail.

When the BS receives the urgent signal from the urgent UE, the BS may operate in three following forms.

Postponing or canceling transmission of UL grant message scheduled to be transmitted to general UE Broadcasting acknowledgment signal for urgent signal Transmitting urgent acknowledgment signal First, method ① will be described with reference to FIG. 20.

Figure 20:
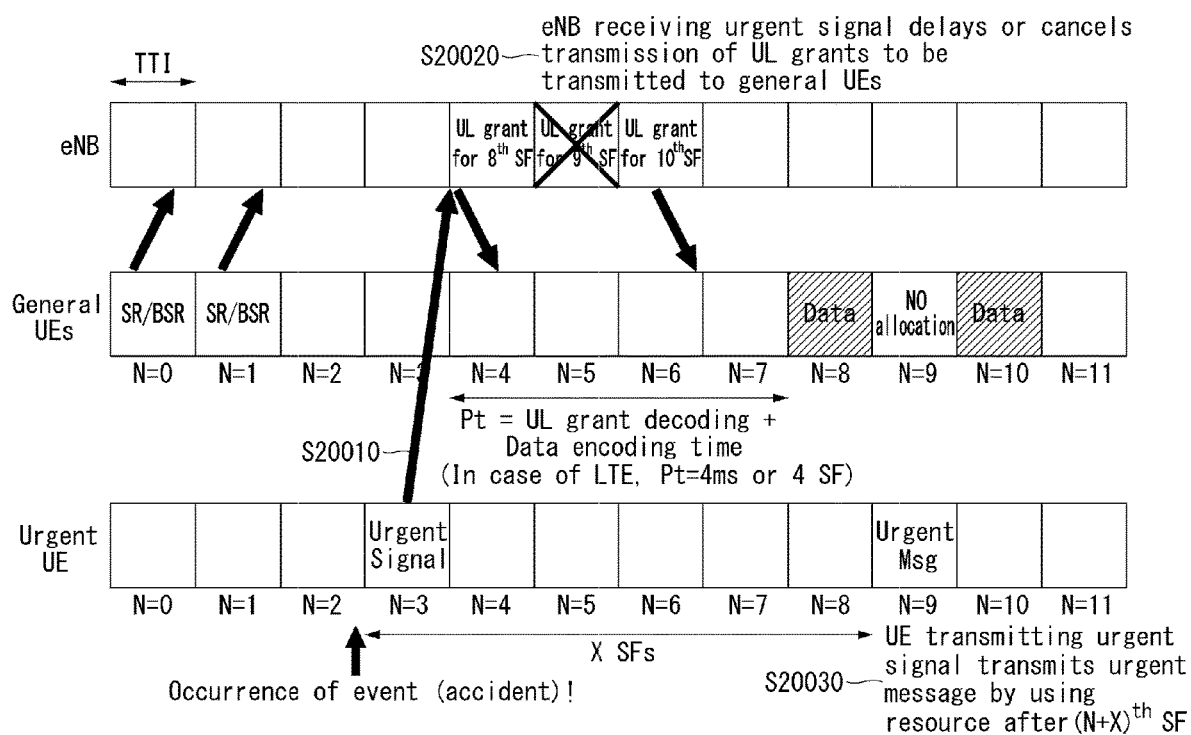
FIG. 20 is a diagram illustrating an example of an operating method of a base station for supporting urgent message transmission proposed by this specification.

Here, FIG. 20 is a diagram illustrating an example of an operating method of a base station for supporting emergency message transmission proposed by this specification.

In the case of FIG. 20, a method for implicitly allocating the resource for the urgent message transmission of the urgent UE by canceling or discarding the UL grant of the general UE when the BS receives the urgent signal from the urgent UE is described.

When the BS receives the urgent signal from the urgent UE (S1910), the BS discards or cancels the UL grant (message) generated for the general UEs in order to preferentially allocate the UL grant for UL data transmission to the urgent UE (S1920).

As illustrated in FIG. 20, when the BS receives the urgent signal from the urgent UE through the Nth SF (SF #N), the BS releases all UL grants to be allocated for the UL data transmission of the general UE in the (N+P$_t$)th SF.

Then, the BS delays the UL grant to the general UEs to allocate resources in the (N+P$_t$+1)th SF or the subsequent SF.

Here, when the BS may immediately cancel the UL grant to the general UEs in the SF (SF #N) receiving the urgent signal, the UL data transmission of the UEs is delayed to the (N+P$_t$+1)th SF. In this regard, the UL grant to the general UE is allocated or transmitted in the (N+1)th SF.

Further, when the BS may cancel the UL grant to the general UEs in SF (SF #N+1) immediately after the SF (SF #N) receiving the urgent signal, the UL data transmission of the general UEs is delayed to the (N+P$_t$+2)th SF. In this regard, the UL grant to the general UE is allocated or transmitted in the (N+2)th SF.

Here, when the BS cancels the UL grant from the SF immediately following the SF to which the urgent signal is received, the urgent UE may transmit the urgent message to the BS after a UL grant decoding time and a data encoding time (processing time) of the general UEs until canceling the UL grant to the general UEs.

Here, in the case where the BS receives the urgent signal transmitted from the urgent UE and the time for recognizing the urgent signal is less than 1 ms (for example, a request time for detecting a signal or sequence in case of Wi-Fi is within 4 us), the UE may cancel or delay the UL grant scheduled to be transmitted to the general UEs in SF (SF #N+1) immediately following the SF #N receiving the urgent signal (as illustrated in FIG. 19).

When the BS receives the urgent signal from the urgent UE in the SF #N, the BS may delay or cancel the UL grant of the general UE allocated after the subframe (SF #N) receiving the urgent signal in consideration of the processing time $P_t$ of the general UE.

Here, the processing time $P_t$ represents the sum of the decoding time and the data (UL data) encoding time for the UL grant of the general UE.

For the LTE(-A) system, the processing time $P_t$ corresponds to 4 ms (4 SF).

However, when the processing time is shortened due to development of the implementation technology of the UE, the BS may immediately delay or cancel the UL grant of the general UEs in the subframe (SF #N) receiving the urgent signal.

Further, the BS may determine the number of UL grant subframes (the number of SFs to which the UL grant is transmitted) of the general UEs to be delayed or canceled by considering the size of the UL grant to be allocated to the urgent signal.

However, considering that the size of the urgent signal transmitted by the urgent UE is generally not large, the number of UL grant subframes of the general UEs to be delayed or canceled may be one.

Referring to FIG. 20, the BS receives the urgent signal from the urgent UE in SF #4.

Then, the BS cancels the UL grant for the UEs allocated to SF #5 in consideration of the processing time of the system.

Thereafter, the urgent UE transmits the urgent signal to the BS and thereafter, transmits to the BS an urgent message including detailed information related with the urgent situation in SF #9 after X SFs (X=6) (S20030).

Here, since the UL grant in SF #5 is canceled, the general UE does not transmit the UL data to the BS in SF #9, and transmits the UL data to the BS by using the UL grant received through SF #6 in the subsequent SF (SF #10).

Additionally, the BS may transmit UL grant cancel information or the like to notify the general UE that the UL grant scheduled to be transmitted to the general UE is canceled, to the general UE. This will be described in more detail with reference to FIG. 21.

Alternatively, the general UE monitors or overhears the urgent signal transmitted by the urgent UE, thereby estimating that the UL grant to be allocated to the urgent UE to be canceled. Thus, the urgent UE may not transmit the UL data to the BS at the time of transmitting the urgent message.

In this case, the general UE may precisely predict in which SF the UL grant of the general UE is cancelled by considering the processing time, etc., and as a result, in which SF the UL data may not be transmitted.

As described above, the processing time $P_t$ is the sum of the decoding time for the UL grant and the encoding time of the UL data.

Next, method ② will be described with reference to FIG. 21.

Figure 21:
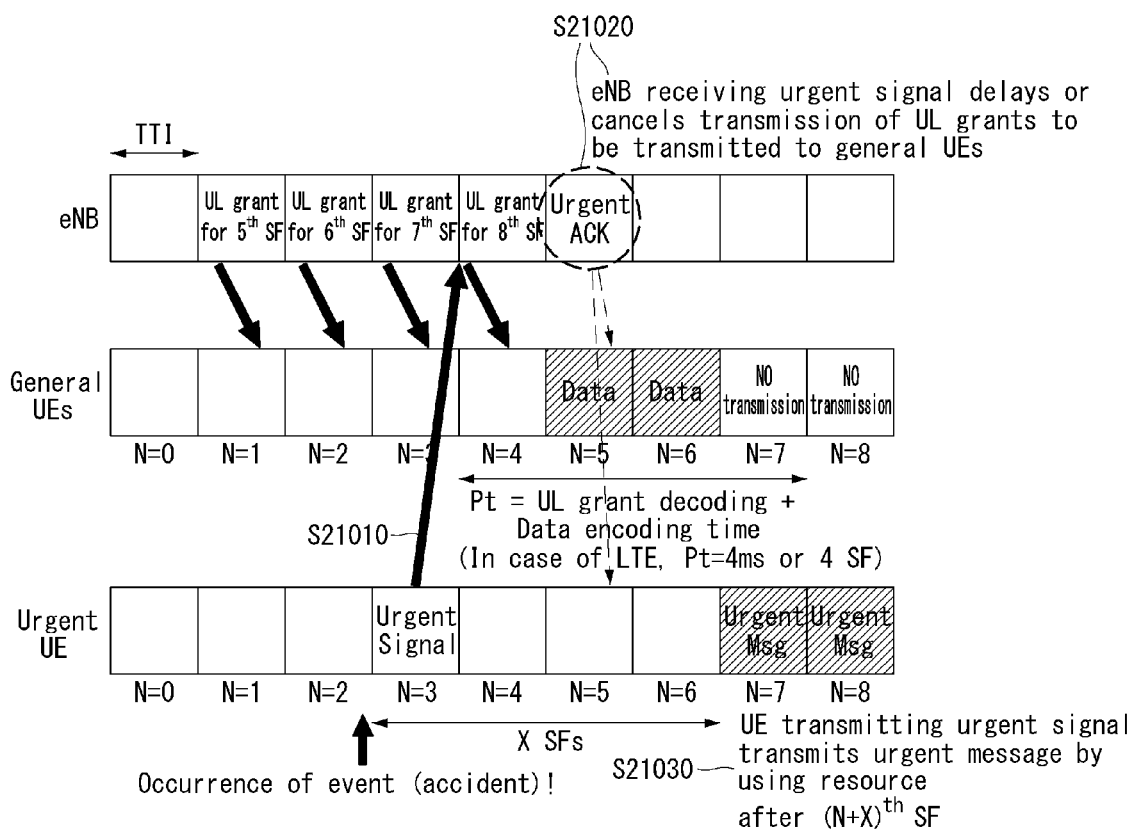
FIG. 21 is a diagram illustrating another example of the operating method of the base station for supporting urgent message transmission proposed by this specification.

FIG. 21 is a diagram illustrating another example of the operating method of the base station for supporting emergency message transmission proposed by this specification.

FIG. 21 illustrates a method for broadcasting an acknowledgment signal for an urgent signal for notifying all UEs in a cell that a specific urgent event occurs when the BS receives the urgent signal.

That is, in FIG. 21, the BS explicitly transmits the occurrence of the urgent event to the general UE, thereby indicating that the transmission of the UL data to the general UE is stopped at the transmission time of the urgent message.

When the BS receives the urgent signal from the urgent UE (S2010), the BS transmits a notification signal to notify all the UEs in the cell that the urgent event occurs (S21020).

The notification signal may be represented by an acknowledgment signal of the urgent signal or an urgent signal response, an urgent ACK signal, or a response signal.

Here, the BS cancels or delays the transmission of the UL grant to be transmitted to the general UEs at the time of transmitting the notification signal (e.g., SF #5).

Further, the general UE may disregard all UL resources allocated from the BS through the UL grant after receiving the notification signal from the BS.

That is, since the general UE that receives the urgent ACK signal from the BS may receive the ACK signal before decoding the UL grant and encoding a new message (UL data), the general UE does not transmit the UL resource in the SF allocated after the urgent ACK signal so that the urgent UE may use the uplink resource allocated to the general UE.

Therefore, the 'No transmission SF' indicating that the general UE does not transmit the UL data even though the UL grant is allocated from the BS is preferably defined as SF after the time when the general UEs receive the urgent ACK signal broadcasted from the BS.

Here, the general UE may not ignore all UL resources after receiving the urgent ACK signal from the BS.

That is, since a predetermined time (X SFs) is required for the urgent UE to transmit the urgent signal to the BS and transmit the urgent message based on the urgent signal is transmitted to the BS and/or the neighboring UEs (S2030), the general UE may transmit the UL data between the urgent signal transmission time and the urgent message transmission time of the urgent UE by considering the required time.

In FIG. 21, the predetermined time is expressed as X SFs, and the predetermined time may indicate the processing time for the urgent UE to decode the urgent ACK signal and encode the urgent message.

That is, the general UE may transmit the UL data through the received UL grant until the urgent message is transmitted due to the processing time of the urgent UE.

As illustrated in FIG. 21, the general UE may transmit the UL data in SFs #5 and #6 prior to SF #7 in which the urgent UE transmits the urgent message (first).

Here, when the processing time (urgent ACK decoding time+urgent message encoding time) of the urgent UE is truncated, the time for transmitting the UL data until the urgent message transmission may be reduced.

The processing time of the urgent UE may be previously shared with the general UE and/or the BS.

Therefore, when the general UE receives the urgent ACK signal from the BS, the general UE may determine whether to transmit the UL data by considering the urgent signal transmission time of the urgent UE, the processing time of the urgent UE, and the urgent message transmission time.

This allows limited UL resources to be efficiently used.

Further, the urgent message transmission time of the urgent UE may be related to a cancellation time of the UL data transmission of the general UE after receiving the urgent ACK signal of the general UE.

Specifically, when the general UE may cancel the UL data transmission in the SF immediately after the SF receiving the urgent ACK signal from the BS, the urgent message transmission time of the urgent UE may be faster.

Referring to FIG. 21, it can be seen that the time required for the urgent UE to transmit the urgent signal to the BS and the time for the general UEs to receive the urgent ACK from the BS is approximately 3 ms.

As illustrated in FIG. 21, when the general UE may cancel the UL data transmission from the SF (SF #6) immediately after receiving the urgent ACK from the BS (SF #5), a time for which the urgent UE transmits the urgent message after transmitting the urgent signal (SF #3), that is, X may be defined as 3 SFs.

However, when the general UE receives the urgent ACK and may not cancel the UL data transmission in the next SF, the X may be defined as 4 SFs.

Further, the No transmission SF may be defined as one or one or more consecutive SFs after the urgent ACK receiving SF.

The No transmission SF indicates an SF in which the general UE may not transmit the UL data due to the urgent signal transmission of the urgent UE and may indicate an SF in which the UL data transmission of the general UE is prohibited or the urgent message of the urgent UE is transmitted.

The No transmission SF may be configured from SF #(N+2) to SF #(N+$P_t$−1) in consideration of the $P_t$ time of the system.

Here, N may represent the number of the SF that receives the urgent ACK and the $P_t$ time may represent the sum of the UL grant decoding time and the data encoding time.

For example, when the general UE receives the urgent ACK at SF #5 and $P_t$=4 SF, the No transmission SF (No tx. SF) is configured from SF #7 to SF #8.

Alternatively, the No transmission SF may be configured as M consecutive SFs starting from SF #(N+2).

For example, when the general UE receives the urgent ACK at SF #5 and M=4 SF, the No transmission SF (No tx. SF) is configured from SF #7 to SF #10.

Alternatively, the No transmission SF may be defined as one SF after the UE receives the urgent ACK.

In this case, the No transmission SF may be configured as SF #(N+2) in consideration of the urgent ACK reception time of the general UE.

For example, when the general UE receives the urgent ACK at SF #5, the No transmission SF (No tx. SF) is configured as SF #7.

The urgent ACK signal may be transmitted from the BS to the UEs in the cell in the same method as the urgent signal transmitted by the urgent UE.

Here, it is preferable that the urgent ACK signal is transmitted in the broadcast scheme because the urgent ACK signal is a signal that should be received by all UEs (general UE and urgent UE) in the cell.

In this case, the urgent ACK signal may be transmitted through a specific resource of the PDCCH.

A method for transmitting the urgent ACK signal to the general UEs in the cell will be described below in detail.

Urgent Message Transmission Method

Next, a method for transmitting the urgent message by the urgent UE, that is, a third step (step S19030 of FIG. 19) in the 3-step method will be described in detail.

This method relates to a method in which the urgent UE transmits the urgent message after transmitting the urgent signal.

That is, the urgent UE transmits the urgent signal to the BS in SF #N and then transmits the urgent message to the BS and/or neighboring UEs in SF (SF #N+X) after X SFs from SF #N.

The urgent message includes detailed information related to the urgent event which occurs in the urgent UE.

As described above, the value of the X may be determined according to the time of canceling the UL data after receiving the urgent ACK signal in the general UE.

Alternatively, the X value may be determined according to the configuration of the No transmission SF.

Hereinafter, a time at which the urgent UE secures the resources for transmitting the urgent message will be described in more detail.

The transmission timing of the urgent message may be variously set according to the methods (FIGS. 19 and 20) of the urgent signal reception and the urgent acknowledgment transmission of the BS.

First, according to FIG. 20 (method ①), the UEs do not transmit any UL data in the No transmission SF.

That is, the BS does not allocate or transmit the UL grant to the general UEs so that the general UEs may not transmit the UL data in the No transmission SF (No tx. SF).

In this way, the BS implicitly allocates the resource to which the urgent UE may transmit the urgent message.

In this case, the urgent UE transmits the urgent message to the BS and/or neighboring UEs by using a predefined data transmission scheme (e.g., MCS, power, etc.) through the resources of SF (SF #N+X) after a predetermined time or X SF from the time (SF #N) of transmitting the urgent signal.

Next, according to FIG. 21 (method ②), the BS explicitly transmits the urgent ACK signal to the UEs in the cell so that the general UEs may not transmit the UL data in the No transmission SF (No tx. SF).

In this case, when the SF corresponding to the UL grant of the general UE corresponds to the No transmission SF (No tx. SF), all general UEs in the cell, which receive the urgent ACK signal do not the UL data through the SF, that is, the No transmission SF.

Accordingly, the urgent UE transmits the urgent message through the No transmission SF (No tx. SF) based on the reception of the urgent ACK signal.

Hereinafter, a method for transmitting the urgent ACK signal to the general UEs in the cell will be described in detail.

Figure 22:
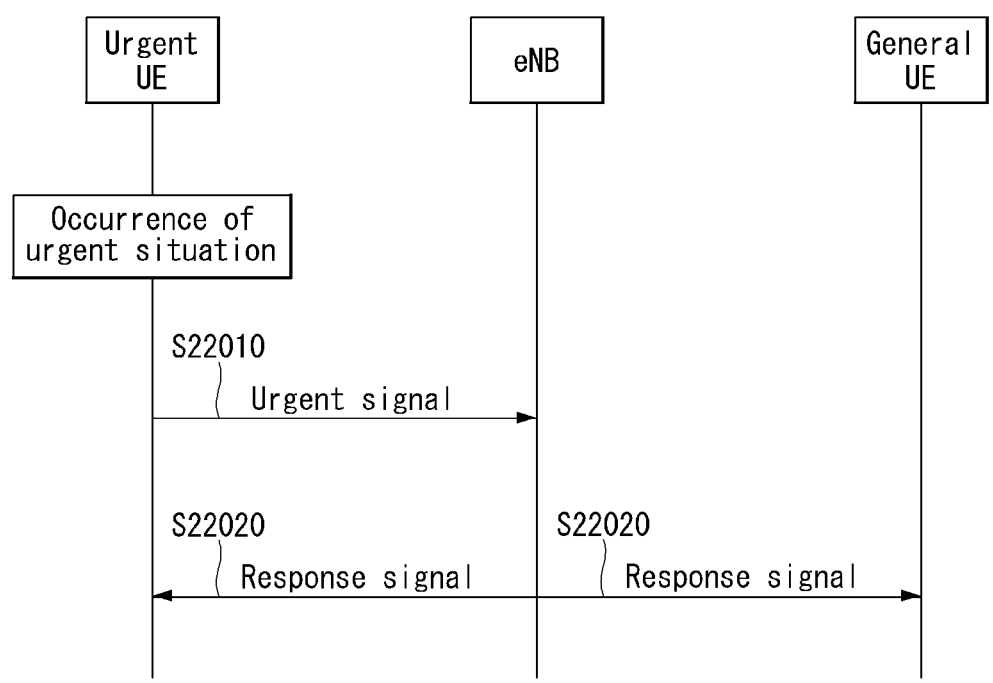
FIG. 22 is a diagram illustrating yet another example of the operating method of the base station for supporting urgent message transmission proposed by this specification.

FIG. 22 is a diagram illustrating yet another example of the operating method of the base station for supporting emergency message transmission proposed by this specification.

Referring to FIG. 22, when the BS receives the urgent signal described in FIG. 18 from the UE, the BS may transmit a response signal to inform other UEs in the cell of the reception of the urgent signal.

Specifically, as illustrated in FIGS. 19 to 21, when the urgent situation occurs, the urgent UE transmits the urgent signal to the BS (S22010).

In this case, the resource may be allocated in units of the specific event and when one or more UEs transmit an urgent signal related to the same event to the BS, the UEs may transmit the urgent signal by using the same resource.

The BS receiving the urgent signal transmits the urgent signal to the UEs in the cell, i.e., the urgent UE and other general UEs in the cell in order to inform UEs in the cell of the information related to the urgent situation (S22020).

In this case, the BS may transmit the urgent signal to the UEs in the cell through two following methods.

① Transmission through the downlink physical control channel (for example, PDCCH or PBCH)

② Transmission through the downlink physical data channel (for example, PDSCH)

Hereinafter, each method will be described in detail.

Transmission Through Physical Downlink Urgent Channel

In this method, the BS transmits the response signal to the UEs in the cell through the physical downlink urgent channel. In this case, a physical channel for transmitting the response signal is defined as a physical downlink urgent channel (PDUCH).

In order to transmit the response signal through the PDUCH, the BS may previously share downlink resource information for each urgent situation within the channel to the UEs in the cell.

For example, the BS may define a specific resource region in the physical control channel as the PDUCH through a system information block (SIB) for transmitting system information and also define index information related with to which a specific resource of the PDUCH is mapped.

In this case, in respect to the index information, the resource information of the PDUCH may be mapped as it is according to the number (n) of events of the urgent situation defined in Table 4 above.

For example, when n events are defined in the UrgentSignal-Config information element or the PCUH-Config information elements illustrated in FIGS. 19 to 21, the PDUCH resources are allocated as many as X*n REs Elements (which may be defined similar to PHICH, and where X=12 if orthogonal sequences are not used) from the start point of the PDUCH resource.

Here, the PHICH may transmit 8 HARQ ACK/NACKs through 12 REs using OS 8.

Alternatively, X*n CCEs (which may be defined in units of CCE if the resources are defined similarly to PFCCH resource information, and when 1 event is allocated to 1 CCE, X=1) resources may be allocated.

In this case, each PDUCH resource index 0 to index (n−1) may be mapped as it is from event 0 to event (n−1).

The position of the PDUCH may be transmitted in a first OFDM symbol of a first slot of each subframe. For example, the PDUCH may be located after the PCFICH or after the PHICH in the physical downlink urgent channel.

That is, the resource order of PCFCI, PHICH, and PDUCH in the physical downlink urgent channel may be ① PCFICH→PHICH→PDUCH or ② PCFICH→PDUCH→PHICH.

The PCFICH is used for informing the number of symbols (1, 2, 3) for the PDCCH and is fixed in size by 4 REGs (16 REs). Since the PDUCH may have a fixed size according to the number n of events defined in the cell and a resource size (X REs) required for each event, the UE may know the sizes of the PHICH and the PDUCH in advance.

In this case, in the PCFICH, four consecutive resource elements may be located at the 10th, 20th, 30th, and REG index of the first symbol (16 REs in total).

Since the PCFICH, the PHICH, and the PDUCH are all allocated with the fixed size in the downlink control channel in the cell, it is possible to design resources allocated to each channel not to collide with each other.

That is, it is possible to design the resources to be allocated to positions where collision does not occur.

In addition, the positions of the resources allocated to the PDCCH may be changed according to the positions of the resources allocated to the PCFICH, the PHICH, and the PDUCH.

The size of the PDUCH may be transmitted to the UEs in the cell through the PBCH. In this case, information related to the total size of the PDUCH may be transmitted, the resource size for each event related to the urgent situation may be transmitted, and when the resource size for each event is transmitted, information related to the number of all events may be transmitted.

Upon receiving the index information related to the specific resource index of the PDUCH through the SIB, the UEs may know which urgent situation occurs when the response signal is transmitted through the index information.

Thereafter, the UE may transfer the information related to the urgent situation received through the response signal to a higher layer (for example, an application layer) and perform an operation according to the urgent situation through the application layer.

In this case, the operation according to the urgent situation may be configured differently according to the urgent situation and the UE (for example, in case of a traffic accident, information on detour road information is received or a vehicle is stopped).

The PDUCH may transmit the response signal to the UEs in the cell through the ON/OFF keying scheme described above through the specific RE resource. That is, by using a method for spreading 1-bit information to 4 consecutive REs similar to the PHICH and repeating the spreading 3 times, it may be notified that the urgent situation occurs to the UEs in the cell through a total of 12 REs.

The BS maps the urgent situation for each index in advance using the index information of each RE of the PDUCH and upon receiving a signal indicating that a specific urgent situation occurs from the urgent UE, the BS transmits the response signal related with the specific urgent situation to the UEs in the cell through the resource for the index of the PDUCH mapped to the received signal.

That is, the index of the PDUCH is defined by the same number as the number of urgent situations defined in the urgent signal configuration and the index of the PDUCH may be mapped for each urgent situation.

In yet another embodiment of the present invention, the PDUCH may be defined in units of the CCE. That is, the same number of CCE indexes as the number of urgent situations defined in the urgent signal configuration may be defined and each CCE index may be mapped to each urgent situation.

In this case, the information related to the urgent situation transmitted through the PDUCH may be transmitted through the common search space.

According to still yet another embodiment of the present invention, the information related to the urgent situation may be transmitted through a physical broadcast channel (PBCH). In this case, n-bit bitmap resources may be allocated through the PBCH and the urgent situation may be mapped to bitmap indices 0 to (n−1).

In this way, when the information related to the urgent situation is transmitted through the above-described physical control channel, the information related with the urgent situation may be repeatedly transmitted for a specific time in order for not only the UE (connected UE) connected to the BS but also an idle UE to receive the information related to the urgent situation.

In addition, indication information may be transmitted to the UEs in the cell through the PBCH or PCH, which indicates that the information related to the urgent situation is transmitted via the PDUCH.

Transmission Through Physical Downlink Shared Channel

In this method, the BS transmits the response signal to the UEs in the cell through the physical downlink shared channel.

The BS may transmit the information related to the urgent situation to the UEs in the cell through the PDSCH using a broadcast, multicast, or unicast transmission method.

Transmission Using Broadcast

When the BS transmits the information related to the urgent situation to the UEs in the cell using the broadcast transmission method, the BS transmits the information related to the urgent situation to an RRC system information transmission message such as the system information block (SIB).

In this case, the SIB may be newly defined to transmit the information related to the urgent situation, or may adopt an existing SIB.

The SIB may be transmitted only when a specific urgent situation occurs and may be repeatedly transmitted through one or more TTIs (or subframes) so that all UEs (connected UE and an idle terminal) may receive the SIB.

In addition, an indicator indicating that the information related to the urgent situation is transmitted through the SIB is transmitted through the PBCH or the PCH so that the idle UE may receive the SIB to notify to the idle UE that the information related to the urgent situation is transmitted through the SIB.

Transmission Using Unicast/Multicast

The BS may transmit the information related to the urgent emergency situation through a downlink data channel using a unicast or multicast transmission scheme to notify a specific UE or specific UEs in the cell that the urgent situation occurs.

For example, the information related to the urgent situation may be transmitted through a specific radio network temporary identifier (RNTI) using the unicast or multicast transmission scheme.

When the multicast transmission scheme is used, the RNTI (e.g., U-RNTI or Urgent RNTI) for transmission of the information is defined so as to receive the information related to the urgent situation regardless of the status of the UE receiving the information.

By setting a specific interval in the cell so that the idle UE may receive the information related to the urgent situation by using the defined RNTI, the idle UE may transmit the information related to the urgent situation in the set interval.

In this case, an indicator is transmitted through the PBCH or PCH at the set interval, which indicates that the information related to the urgent situation is transmitted through the SIB to instruct the idle UE to receive the information related to the urgent situation at the set interval.

In this way, when the BS receives a signal or a message for notifying the occurrence of the urgent situation from the UE, the received signal or message is quickly notified to the UEs in the cell, thereby preventing the occurrence of a secondary accident and rapidly and efficiently coping with the urgent situation when the urgent situation occurs.

General Apparatus to which Present Invention is Applicable

Figure 23:
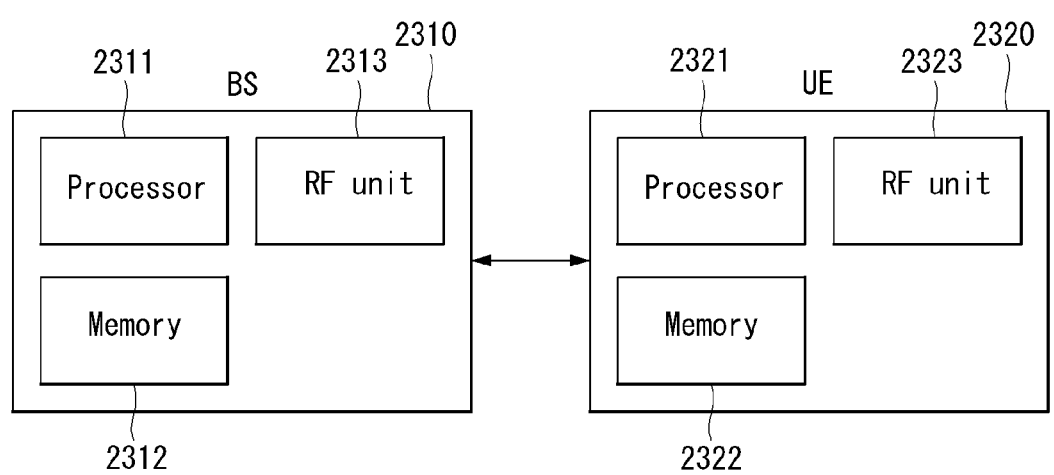
FIG. 23 illustrates a block diagram of a wireless communication device to which methods proposed in this specification may be applied.

FIG. 23 illustrates a block diagram of a wireless communication device to which methods proposed in this specification may be applied.

Referring to FIG. 23, a wireless communication system includes a BS 2310 and multiple UEs 2310 positioned within an area of the BS 2320.

The BS 2310 includes a processor 2311, a memory 2312, and a radio frequency (RF) unit 2313. The processor 2311 implements a function, a process, and/or a method which are proposed in FIGS. 1 to 20 above. Layers of a radio interface protocol may be implemented by the processor 2311. The memory 2312 is connected with the processor 2311 to store various pieces of information for driving the processor 2311. The RF unit 2313 is connected with the processor 2311 to transmit and/or receive a radio signal.

The UE 2320 includes a processor 2321, a memory 2322, and an RF unit 2323. The processor 2321 implements a function, a process, and/or a method which are proposed in FIGS. 1 to 20 above. Layers of a radio interface protocol may be implemented by the processor 2321. The memory 2322 is connected with the processor 2321 to store various pieces of information for driving the processor 2321. The RF unit 2323 is connected with the processor 2321 to transmit and/or receive a radio signal.

The memories 2312 and 2322 may be positioned inside or outside the processors 2311 and 2321 and connected with the processors 2311 and 2321 by various well-known means.

Further, the BS 2310 and/or the UE 2320 may have a single antenna or multiple antennas.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

In the wireless communication system of the present invention, the method for transmitting the uplink data is described primarily with various wireless communication systems in addition to an example applied to a 3GPP LTE/LTE-A system.

The invention claimed is:

1. A method for transmitting and receiving, by a base station, urgent data in a wireless communication system supporting a low latency service, the method comprising:

receiving, from an urgent user equipment (UE), an urgent signal notifying occurrence of an event related to an urgent situation;

transmitting an indicator indicating a channel in which a response signal for notifying occurrence of the event is transmitted to the urgent UE and at least one general UE included in a cell;

based on the urgent signal, discarding an uplink (UL) grant generated for the general UE in order to preferentially allocate an UL grant for transmitting the urgent data to the urgent UE;

transmitting, to the at least one general UE, the response signal;

transmitting, to the at least one general UE, system information, based on the response signal being transmitted through the downlink control channel; and receiving, from the urgent UE, the urgent data, wherein the response signal is transmitted through a specific resource region of the downlink control channel, based on the indicator, and wherein the system information includes information on (1) the specific resource region for the event, and (2) the indicator.

2. The method of claim 1, wherein an index of each resource included in the specific resource region is mapped with the event.

3. The method of claim 1, wherein a size of the specific resource region is determined by a number of events related to the urgent situation and a resource element allocated to each event of the number of events.

4. The method of claim 1, wherein the size of the specific resource region is determined by a number of events related to the urgent situation and a control channel element (CCE) allocated to each event of the number of events.

5. The method according to claim 1, wherein the specific resource region is positioned in one symbol of first to third orthogonal frequency division multiplexing (OFDM) symbols of a subframe.

6. The method of claim 1, wherein the specific resource region is positioned next a physical control format indication channel (PCFICH) or a physical hybrid-ARQ indicator channel (PHICH) of the downlink control channel.

7. The method of claim 1, wherein the response signal is transmitted through an on/off keying scheme or a common search space.

8. The method of claim 4, wherein when the response signal is transmitted by the on/off keying scheme, 1-bit information is spread to four consecutive resource elements.

9. The method of claim 8, wherein the spreading is repeated three times.

10. The method of claim 1, further comprising:
transmitting, to the at least one general UE, information related to the event through a physical broadcast channel (PBCH).

11. The method of claim 1, wherein when the response signal is transmitted through the downlink data channel, the response signal is included in an RRC message and transmitted.

12. The method of claim 11, wherein the RRC message is transmitted by any one scheme of broadcast, unicast, and multi-cast transmission schemes.

13. The method of claim 12, wherein when the RRC message is transmitted by the broadcast transmission scheme, the RRC message is transmitted only when the event occurs.

14. The method according to claim 12, wherein when the RRC message is transmitted by any one scheme of the unicast and multi-cast transmission schemes, the RRC message is transmitted through a specific radio network temporary identifier (RNTI) for transmitting the response signal.

15. A base station for transmitting and receiving urgent data in a wireless communication system supporting a low latency service, the base station comprising:
a transceiver for transmitting and receiving a radio signal; and
a processor functionally coupled with the transceiver,
wherein the processor is configured to:
receive, from an urgent user equipment (UE), an urgent signal notifying occurrence of an event related to an urgent situation,
transmit an indicator indicating a channel in which a response signal for notifying occurrence of the event is transmitted to the urgent UE and at least one general UE included in a cell,
based on the urgent signal, discard an uplink (UL) grant generated for the general UE in order to preferentially allocate an UL grant for transmitting the urgent data to the urgent UE,
transmit, to the at least one general UE, the response signal,
transmit, to the at least one general UE, system information, based on the response signal being transmitted through the downlink control channel, and
receive, from the urgent UE, the urgent data,
wherein the response signal is transmitted through a specific resource region of the downlink control channel, based on the indicator, and
wherein the system information includes information on (1) the specific resource region for the event, and (2) the indicator.

16. The method of claim 1, wherein the urgent signal is received on a subframe #n, the UL grant generated for the general UE is discard on a subframe #n+1.

17. The base station of claim 15, wherein the urgent signal is received on a subframe #n, the UL grant generated for the general UE is discard on a subframe #n+1.

* * * * *